United States Patent
Bae et al.

(10) Patent No.: US 11,361,734 B2
(45) Date of Patent: *Jun. 14, 2022

(54) DISPLAY DRIVING METHOD AND ELECTRONIC DEVICE INCLUDING THE DISPLAY DRIVER INTEGRATED CIRCUIT FOR SUPPORTING THE SAME

(71) Applicant: Samsung Electronics Co., Ltd., Suwon-si (KR)

(72) Inventors: Jong Kon Bae, Seoul (KR); Dong Hwy Kim, Hwaseong-si (KR); Dong Kyoon Han, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,203

(22) Filed: Oct. 26, 2020

(65) Prior Publication Data

US 2021/0043169 A1   Feb. 11, 2021

Related U.S. Application Data

(63) Continuation of application No. 15/666,112, filed on Aug. 1, 2017, now Pat. No. 10,818,270.

(30) Foreign Application Priority Data

Aug. 2, 2016 (KR) .................. 10-2016-0098652

(51) Int. Cl.
*G09G 5/36* (2006.01)
*G09G 5/393* (2006.01)
(Continued)

(52) U.S. Cl.
CPC .............. *G09G 5/363* (2013.01); *G06F 3/14* (2013.01); *G09G 5/006* (2013.01); *G09G 5/393* (2013.01);
(Continued)

(58) Field of Classification Search
CPC .... G09G 5/363; G09G 5/006; G09G 2310/08; G09G 2330/021; G09G 2330/023;
(Continued)

(56) References Cited

U.S. PATENT DOCUMENTS 6,469,744 B1   10/2002  Pearlstein
8,749,711 B2    6/2014  Um
(Continued)

FOREIGN PATENT DOCUMENTS

CN   101523328 A   9/2009
CN   102542980 A   7/2012
(Continued)

OTHER PUBLICATIONS

International Search Report dated Nov. 22, 2017, issued in the International Application No. PCT/KR2014/008303 filed Aug. 1, 2017.

(Continued)

*Primary Examiner* — Stephen G Sherman
(74) *Attorney, Agent, or Firm* — Jefferson IP Law, LLP

(57) ABSTRACT

A display driver integrated circuit (DDI) an electronic device including the same, and a display driving method by the same are provided. The display driver integrated circuit includes a receive interface that receives image data from a processor at a first frame rate, a memory that stores the image data received at the first frame rate, and a display timing controller that detects a variation of the image data stored in the memory, changes a frame rate for the image data, which is stored in the memory, based on the variation of the image data, and outputs the image data on the display at the changed frame rate.

9 Claims, 15 Drawing Sheets

(51) Int. Cl.
  *G06F 3/14* (2006.01)
  *G09G 5/00* (2006.01)
(52) U.S. Cl.
  CPC ... *G09G 2310/08* (2013.01); *G09G 2320/103* (2013.01); *G09G 2330/021* (2013.01); *G09G 2330/023* (2013.01); *G09G 2340/0435* (2013.01); *G09G 2360/18* (2013.01); *G09G 2370/08* (2013.01)
(58) Field of Classification Search
  CPC ....... G09G 2340/0435; G09G 2360/18; G09G 2370/08; G09G 5/393; G06F 3/14
  See application file for complete search history.

(56) References Cited

U.S. PATENT DOCUMENTS

| | | | |
|---|---|---|---|
| 8,860,639 | B2 | 10/2014 | Kim et al. |
| 8,878,995 | B2 | 11/2014 | Cha et al. |
| 9,318,072 | B2 | 4/2016 | Cha et al. |
| 9,424,805 | B2 | 8/2016 | Lee et al. |
| 9,524,092 | B2 | 12/2016 | Ren et al. |
| 10,319,317 | B2 | 6/2019 | Okamoto et al. |
| 10,818,270 | B2 * | 10/2020 | Bae ................ G09G 5/363 |
| 2010/0013995 | A1 | 1/2010 | Um |
| 2010/0245316 | A1 | 9/2010 | Cheng |
| 2012/0162159 | A1 | 6/2012 | Kim et al. |
| 2013/0009920 | A1 | 1/2013 | Sim |
| 2013/0057763 | A1 | 3/2013 | Cha et al. |
| 2013/0106810 | A1 | 5/2013 | Kim et al. |
| 2013/0257752 | A1 | 10/2013 | Tripathi et al. |
| 2014/0253537 | A1 | 9/2014 | Lee et al. |
| 2015/0029201 | A1 | 1/2015 | Cha et al. |
| 2015/0195601 | A1 | 7/2015 | Hahm |
| 2015/0346987 | A1 | 12/2015 | Ren et al. |
| 2015/0348496 | A1 | 12/2015 | Santos, II et al. |
| 2016/0027146 | A1 | 1/2016 | Kim et al. |
| 2016/0343288 | A1 | 11/2016 | Kim et al. |
| 2017/0263201 | A1 | 9/2017 | Sato et al. |
| 2018/0158424 | A1 | 6/2018 | Okamoto et al. |

FOREIGN PATENT DOCUMENTS

| | | |
|---|---|---|
| CN | 102982759 A | 3/2013 |
| CN | 104036713 A | 9/2014 |
| CN | 107924666 A | 4/2018 |
| KR | 10-2013-0004737 A | 1/2013 |
| KR | 10-2015-0086007 A | 7/2015 |
| WO | 2015-184175 A1 | 12/2015 |
| WO | 2016093127 A1 | 6/2016 |

OTHER PUBLICATIONS

Extended European Search Report dated May 14, 2019, issued in a counterpart European application No. 17837224.9-1209/3455846.
Chinese Office Action with English translation dated Aug. 2, 2021; Chinese Appln. No. 201780043917.1.

\* cited by examiner

DISPLAY DRIVING METHOD AND ELECTRONIC DEVICE INCLUDING THE DISPLAY DRIVER INTEGRATED CIRCUIT FOR SUPPORTING THE SAME

CROSS-REFERENCE TO RELATED APPLICATION(S)

This application is a continuation application of prior application Ser. No. 15/666,112, filed on Aug. 1, 2017, which claims priority under 35 U.S.C. § 119(a) of a Korean patent application filed on Aug. 2, 2016 in the Korean Intellectual Property Office and assigned Serial number 10-2016-098652, the entire disclosure of which is hereby incorporated by reference.

TECHNICAL FIELD

The present disclosure relates to lower-power display driving.

BACKGROUND

An electronic device of related art may include a display and may visually provide various screens for a user through the display. The display includes a display panel and a display driver integrated circuit (DDI) for driving the display panel. The DDI mounted on the electronic device may receive image data from a processor to drive the display panel.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide display driving methods, capable of reducing power consumption by processing image data at mutually different frame rates according to specified conditions (e.g., image display states), display driver integrated circuits (DDIs) for supporting the same, and electronic devices including the DDIs.

In accordance with an aspect of the present disclosure, an electronic device is provided. The electronic device includes a display, a processor configured to process image data to be output on the display and a DDI configured to output the image data, which is transmitted by the processor, on the display, wherein the DDI is configured to determine whether to change a frame rate of an image corresponding to at least one of an image display state representing whether an image output on the display is a still image or a moving picture, a type of an application related to the image output on the display, or a user input received in relation to an image change and output the image data at a determined frame rate.

In accordance with another aspect of the present disclosure, a DDI is provided. The DDI includes a receive interface configured to receive image data from a processor at a first frame rate, a memory configured to store the image data received at the first frame rate and a display timing controller configured to detect a variation of the image data stored in the memory, to change a frame rate for the image data, which is stored in the memory, based on the variation of the image data, and to output the image data on the display at the changed frame rate.

In accordance with another aspect of the present disclosure, a display driving method is provided. The display driving method includes determining at least one of an image display state representing whether an image output to a display is a still image or a moving picture, a type of an application related to the image output on the display, or a user input received in relation to a change of the image output on the display, changing a frame rate corresponding to the determining of the at least one of the image display state, the type of the application, or the user input, and outputting image data on the display at the changed frame rate.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
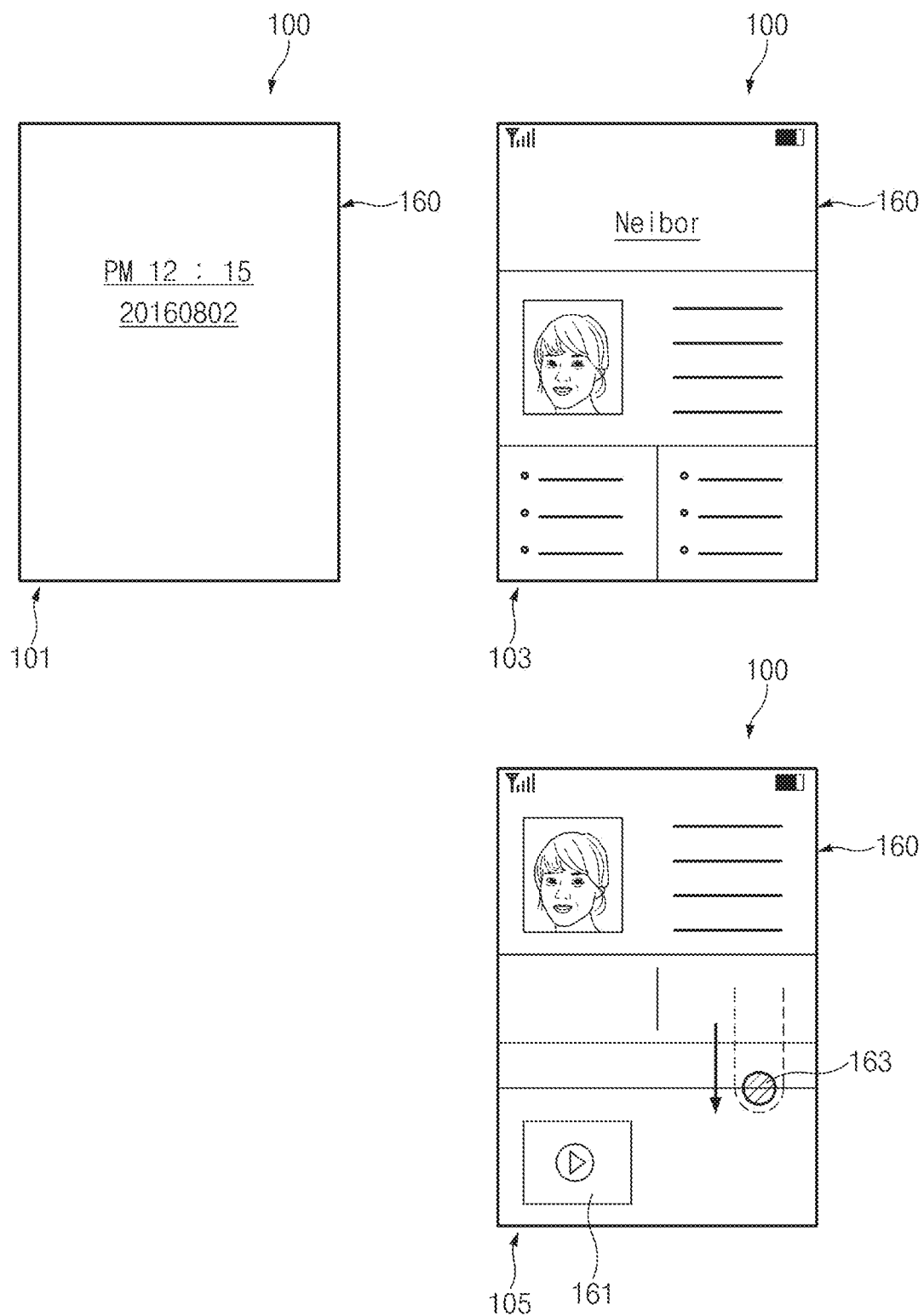
FIG. 1 is a view illustrating one example of a screen interface of an electronic device applied with a display driving method according to an embodiment of the present disclosure.

FIG. 1 is a view illustrating an example of a screen interface of an electronic device applied with a display driving method according to an embodiment of the present disclosure.

Referring to FIG. 1, according to an embodiment of the present disclosure, an electronic device 100 may include a display 160 and may output image data based on the operation of a specified function. For example, the electronic device 100 may provide an always on device (AOD) function for partially outputting image data having a specified size on the display 160 as illustrated in state 101. The AOD function may be applied to various modes such as a low-power mode (a sleep mode) or an inactive mode. As illustrated in FIG. 1, if outputting outputs a screen having an image data output area in specified size or less on the display 160, the electronic device 100 may output the image data may output image data at a first frame rate (e.g., a frame rate of 20 Hz to 50 Hz). As illustrated in FIG. 1, the electronic device 100 may perform a specified function (e.g., may output a screen according to the execution of an AOD or the execution of a lock-screen function) to output image data having the variation of a specified value or less or to output fixed image data (or image data having no variation). In this case, the electronic device 100 may output the image data at the first frame rate.

According to an embodiment, although the electronic device 100 displays image data on the entire display area of the display 160 as illustrated in state 103, the electronic device 100 may output a screen having image data variation of the specified value or less. In this case, the electronic device 100 may output the image data at a second frame rate (e.g., 50 Hz to 60 Hz). For example, in the case that the electronic device 100 outputs a still image (e.g., a web-browser screen, a gallery screen, a text screen, a chatting screen, or a message writing/receiving screen) on the display 160, the electronic device 100 may output the image data at the second frame rate. According to various embodiments, the electronic device 100 may adjust the frame rate according to driving modes (e.g., a normal mode/power saving mode/ultra-power saving mode) of the electronic device 100. For example, the electronic device 100 may employ the first frame rate relatively low in the ultra-power saving mode, the second frame rate higher than the first frame rate in the power saving mode, and a third frame rate higher than the second frame rate in the normal mode.

The normal mode may include a mode of maintaining the brightness of the display 160 to be brightness based on user settings or brightness set to recognize a screen based on sensed external illuminance. The brightness set to recognize the screen may be determined based on statistical data or experimental data. The power saving mode may include a mode of processing the brightness of the display 160 to be darker than that in the normal mode. The ultra-power saving mode may include a mode of processing the brightness of the display 160 to be darker than that in the power saving mode. In addition, the modes may be distinguished therebetween in forms of activating or deactivating at least one of applications (or functions), which are executed in the electronic device 100, by priority. For example, in the normal mode, specified applications or elements (e.g., fitness functions and sensors) of the electronic device 100 may be automatically maintained in an active state and sensor information may be collected and processed. The power saving mode may include a state that applications, which are fewer than applications executed automatically or according to a user input in the normal mode, are maintained in the active state automatically or according to the user input. The ultra-power saving mode may include a state that applications, which are fewer than applications executed automatically in the power saving mode, are maintained in the active state.

According to an embodiment, if the electronic device 100 outputs a screen having image data variation which is more than the specified value as illustrated in state 105, the electronic device 100 may output the image data at the third frame rate (e.g., more than 60 Hz to less than 90 Hz). For example, the electronic device 100 may output the image data at the third frame rate if at least a portion of the screen displayed on the display 160 is a moving picture (e.g., a moving picture thumbnail) 161. In addition, the electronic device 100 may output the image data at the third frame rate, if a user input 163 (e.g., a scroll-related input in the case that the display 160 supports a touch function) occurs. According to various embodiments, the electronic device 100 may include a head mounted device (HMD). In the case that the electronic device 100 is an HMD, the electronic device 100 may collect sensor information and may output image data at a higher frame rate (e.g., the third frame rate) as the motion of the electronic device 100 occurs (e.g., a virtual reality (VR) image is changed as the motion occurs).

As described above, according to an embodiment of the present disclosure, the electronic device 100 may change a frame rate of image data corresponding to at least one of a variation of image data displayed on the display 160, the size of an area for displaying the image data, the type of an application, or a user input received in relation to a screen change, thereby achieving lower-power display driving based on an image display state or outputting a screen having image quality improved according to the screen change. The image display state may include, for example, a still image display state or a moving picture display state. Even if a moving picture is reproduced according to an application function of reproducing the moving picture, a still image may be displayed for specific reproduction duration. In this case, although the electronic device 100 outputs image data at the third frame rate according to the function of reproducing the moving picture, the electronic device 100 may output image data at the second frame rate for the duration that the still image is displayed.

Although the above-described values of the first frame rate, the second frame rate, and the third frame rate have been provided for the purpose of describing frame rates having mutually different sizes, the values may be varied depending on the screen size of the display, the type of an image to be displayed, or a physical property (e.g., a response speed) of the display. In addition, although the above-described screen interface is illustrated in a rectangular shape, the above-described screen interface may have a circular shape or other various shapes depending on a display shape to be displayed. The electronic device 100 may include a rectangular-type smart phone, an edge-type smartphone, pads, and a wearable electronic device such as a watch device.

Figure 2:
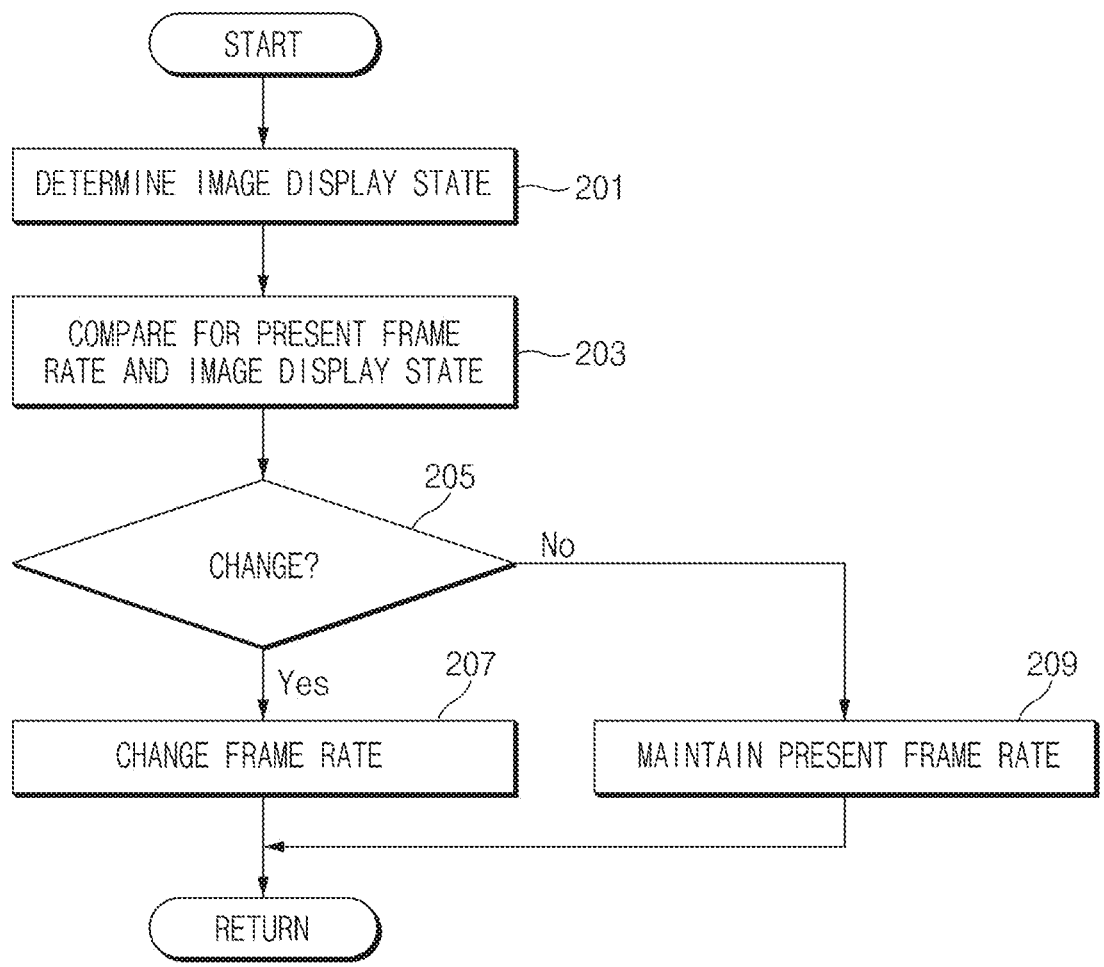
FIG. 2 is a view illustrating a display driving method according to an embodiment of the present disclosure.

FIG. 2 is a view illustrating one example of a display driving method according to an embodiment of the present disclosure.

Referring to FIG. 2, according to an embodiment of the present disclosure, in the display driving method, the electronic device 100 (e.g., a processor or a display driver integrated circuit (DDI)) may determine whether a specified condition is satisfied in operation 201 (e.g., determine the image display state). In this case, the electronic device 100 may determine the type of an application under execution (or the type of an application related to the uppermost layer and output on the display panel 200) or may determine the state of an image currently displayed on the display 160 to determine the state of the displayed image. In addition, the electronic device 100 may determine an update speed of image data by determining a memory (e.g., a frame buffer) related to the display 160. In addition, the electronic device 100 may determine whether a user input occurs in relation to a screen change (e.g., a scroll).

In operation 203, the electronic device 100 may perform comparison for a present frame rate and the image display state. The electronic device 100 may determine whether the determined image display state is matched with the specified frame rate. In this case, the electronic device 100 may store a mapping table that a frame rate is mapped to each image display state. According to an embodiment, the mapping information may include information configured to allocate a lower frame rate in the case that a still image is output and to allocate a higher frame rate in the case that a moving picture is output. In addition, the mapping information may be configured to allocate a lower frame rate in the case that a first function (e.g., an AOD function) is executed, and to allocate a higher frame rate in the case that a second function (e.g., a moving picture reproduction function or the processing of a function according to a user input) is executed.

In operation 205, the electronic device 100 may determine whether a present frame rate needs to be changed. The electronic device 100 may determine whether the present frame rate is equal to a frame rate corresponding to the image display state. If the present frame rate needs to be changed (or if the preset frame rate is different from the frame rate corresponding to the image display state), the electronic device 100 may change the frame rate related to the output of image data in operation 207. According to an embodiment, a processor of the electronic device 100 may determine the number of times that image data stored in a frame buffer is updated for a specified time or the update speed of the image data, thereby determining the frame rate. According to an embodiment, if a data update fails with respect to at least a portion of the frame buffer for a specified time, the processor may allocate a lower frame rate. In addition, if the data update occurs with respect to the at least a portion of the frame buffer for the specified time, the processor may allocate a higher frame rate. In addition, if the data update occurs with respect to the at least a portion of the frame buffer for the specified time, the present frame rate may be gradually increased.

If the present frame rate does not need to be changed (or if the preset frame rate is equal to the frame rate corresponding to the image display state), the processor may maintain the present frame rate in operation 209.

Figure 3:
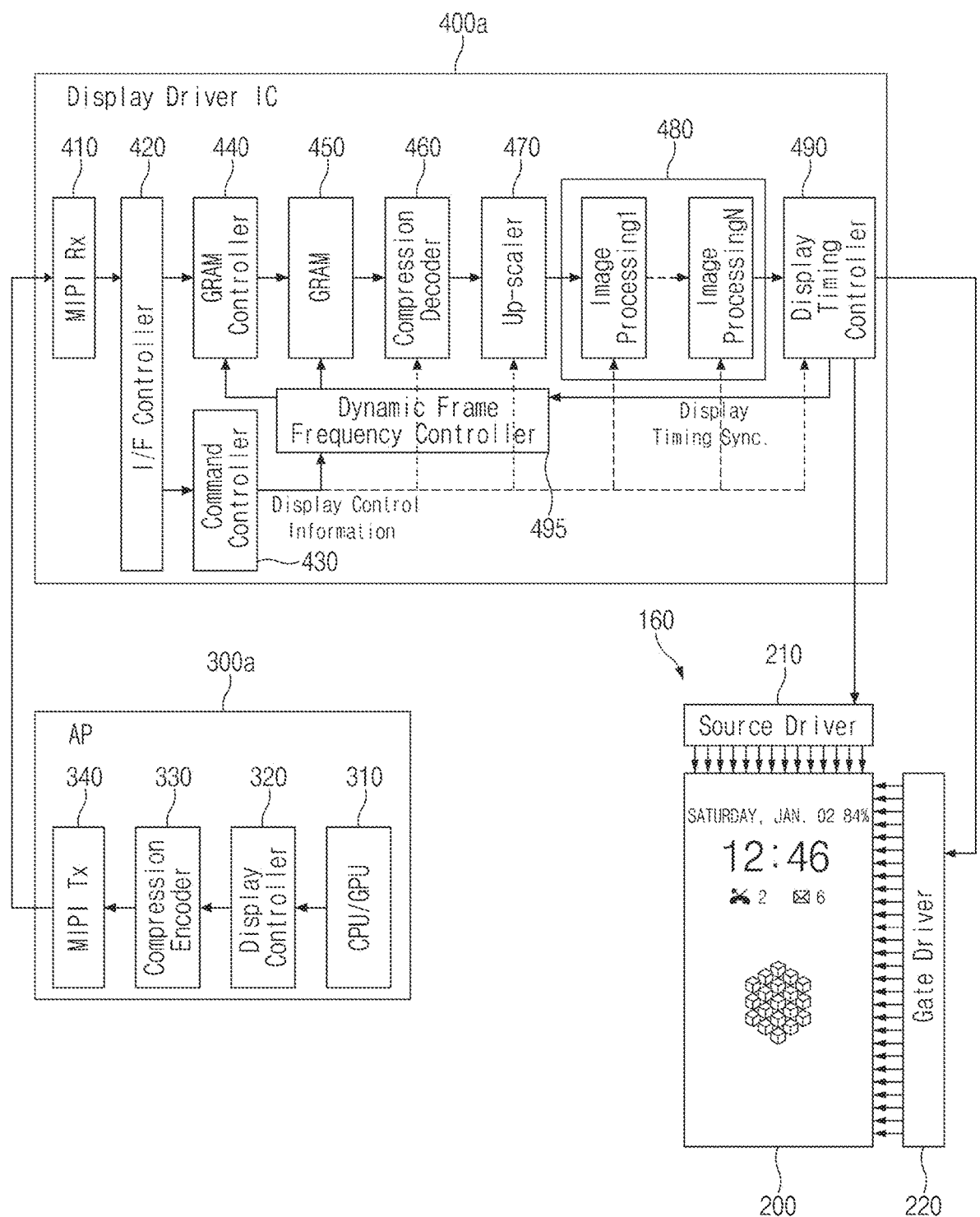
FIG. 3 is a view illustrating one example of some elements related to display driving among elements of the electronic device according to an embodiment of the present disclosure.

FIG. 3 is a view illustrating an example of some elements related to display driving among elements of the electronic device according to an embodiment of the present disclosure.

Referring to FIG. 3, according to the present disclosure, the elements related to the display driving may include a processor 300a (e.g., an application processor (AP), a communication processor (CP), a sensor hub, or the like), a DDI 400a, and a display 160.

According to various embodiments, the processor 300a may generate image data and may provide the generated image data to the DDI 400a. For example, after encoding or compressing the image data in a specified manner, the processor 300a may provide the image data to the DDI 400a. According to an embodiment, the processor 300a may determine an image display state and may transmit information (e.g., at least one instruction or message), which is used to request outputting image data at the frame rate corresponding to the image display state, to the DDI 400a. Alternatively, the processor 300a may determine the image display state and may transmit information, which is used to request maintaining a present frame rate according to the image display state, to the DDI 400a. If the operation of determining the image display state is set to be in charge of the DDI 400a, the processor 300a may transmit the image data to the DDI 400a (e.g., a memory (graphic random access memory (GRANT)) 450) at a specified frame rate.

The processor 300a may include a central processing unit (CPU)/graphic processing unit (GPU) 310, a display controller 320, a compression module (e.g., a compression encoder) 330, and an internal transmit interface (e.g., a mobile industry processor interface (MIPI) Tx) 340.

The CPU/GPU 310 may process an operation for data to be output on the display 160 corresponding to scheduling information or a user input. The CPU/GPU 310 may transmit the processed data to the display controller 320.

The display controller 320 may generate image data to be transmitted to the DDI 400a based on the data transmitted by the CPU/GPU 310. According to an embodiment, the image data may be output at a specified frame rate (e.g., 60 Hz).

The compression module 330 may encode the image data generated from the display controller 320 in a specified scheme (e.g., a display stream compression (DSC) scheme determined by video electronics standards association (VESA)). Accordingly, the image data generated from the display controller 320 may be compressed and reduced in data size. For example, the size of the image data generated from the display controller 320 may be reduced 1/n of the size through the encoding of the compression module 330. According to various embodiments, the compression module 330 may be omitted. In other words, the image data may be transmitted to the DDI 400*a* without compressing the image data.

The internal transmit interface 340 may transmit the image data encoded by the compression module 330 to the DDI 400*a*. The internal transmit interface 340 may include, for example, a MIPI. The internal transmit interface 340 may transmit control information (e.g., information on the image display state or information related to a frame rate to be changed according to the image display state) related to the output of the image data and image data, which is to be output on the display panel 200, to the DDI 400*a*.

The DDI 400*a* may output the image data on the display panel 200 at a specified frame rate in response to the control of the processor 300*a*. For example, the DDI 400*a* may receive the image data and information (or instructions) related to the frame rate from the processor 300*a* and may output the image data at the frame rate corresponding to the received information. In this operation, the DDI 400*a* may receive the image data at the specified frame rate (e.g., 60 Hz) from the processor 300*a*, may store the image data in the memory 450, may determine information (e.g., an instruction for requesting for changing into 50 Hz) related to the frame rate, and may output the image data at the changed frame rate.

According to various embodiments, if the processor 300*a* enters into a lower-power mode, the DDI 400*a* may output the image data based on the information related to a frame rate, which is previously received, until information related to a next frame rate is received. Alternatively, if the processor 300*a* enters into the lower-power mode, the DDI 400*a* may determine an image display state depending on a specified configuration (e.g., in the case that the processor 300*a* does not provide additional information related to a frame rate), and may change the frame rate corresponding to the image display state. In this case, the processor 300*a* may be configured to enter into the lower-power mode (sleep mode) after providing the image data and the information for requesting for changing or maintaining the frame rate to the DDI 400*a*.

According to an embodiment, the DDI 400*a* may determine whether to change code information (e.g., 2Ch) for indicating an image change. If the code information is not changed for a specified time, the DDI 400*a* may output image data (e.g., image data corresponding to a still image) by employing a lower frame rate. According to an embodiment, if the code information (e.g., 2Ch) for indicating the image change is changed to a specified value or more for a specified time, the DDI 400*a* may determine the image change to be more greatly represented and may output the image data (e.g., image data corresponding to a moving picture) by employing a higher frame rate.

The DDI 400*a* described above may include an internal receive interface (e.g., MIPI Rx) 410, an interface controller 420, a command controller 430, a memory controller (e.g., a GRAM controller) 440, a memory 450 (e.g., GRAM), a decoding module (e.g., a compression decoder) 460, an up-scaler 470, an image pre-processor 480, a display timing controller 490, and a dynamic frame frequency controller (DFFC) 495. Although not illustrated in FIG. 3, according to various embodiments, the DDI 400*a* may further include an oscillator, a frame frequency adjusting module, or a pixel power applying module.

The internal receive interface 410 may communicate with the processor 300*a* to receive control information and image data from the processor 300*a*. The internal receive interface 410 may include, for example, an MIPI receiving circuit. If the internal receive interface 410 receives the control information and the image data through the MIPI receiving circuit of the processor 300*a*, the internal receive interface 410 may transmit the control information and the image data to the interface controller 420.

The interface controller 420 may receive the image data and/or control information from the processor 300*a*. The interface controller 420 may transmit the received image data to the memory controller 440. The interface controller 420 may transmit the received control information to the command controller 430.

The memory controller 440 may write the image data, which is received from the interface controller 420, into the memory 450. For example, the memory controller 440 may write the image data into the memory 450 at the frame rate of the image data transmitted by the processor 300*a*.

The memory 450 may include a GRAM. The memory 450 may store the image data transmitted by the memory controller 440. In this operation, the memory 450 may store the image data at the specified frame rate (e.g., 60 Hz) in response to the control of the processor 300*a*. The stored image data may include image data compressed by the processor 300*a* or uncompressed image data. The memory 450 may include a memory space corresponding to the resolution and/or the number of color gradations of the display panel 200. The memory 450 may include a frame buffer or a line buffer. The number of times or the rate of updating the memory 450 may be varied depending on the type of an image to be output on the display panel 200. For example, regarding the reproduction of the moving picture, the memory 450 may store image data corresponding to the frame of a related moving picture at a specified frame rate. Regarding to a still image, the memory 450 may store the still image until an image update occurs.

The command controller 430 may control the display timing controller 490 to output the image data stored in the memory 450 on a specified area of the display panel 200 at a specified frame rate. The command controller 430 may be referred to as "control logic". According to an embodiment of the present disclosure, the command controller 430 may receive the control information from the interface controller 420 and may control an ON or OFF state of a DFFC function based on the control information. The DFFC function may include a function of changing a frame rate corresponding to the control. According to an embodiment, if the command controller 430 receives information related to a frame rate corresponding to the image display state, the command controller 430 may transmit information for requesting for the change of the frame rate to the DFFC 495. In addition, the command controller 430 may perform a control operation such that a previous frame rate is maintained if the frame rate does not need to be changed.

If at least a portion of the image data read from the memory 450 is encoded data, the decoding module 460 decodes the at least a portion of the image data in a specified scheme and may transmit the decoded data to the display timing controller 490. For example, if the image data has a size compressed to 1/n by the compression module 330 of the processor 300*a*, the decoding module 460 may uncompress the at least a portion of the image data to recover the image data to original data before the compression.

The up-scaler 470 and/or the image pre-processor 480 may be disposed between the decoding module 460 and the display timing controller 490. According to various embodiments, if at least a portion of image data selected by the command controller 430 is not encoded data, the decoding module 460 may be omitted or bypassed.

The up-scaler 470 may enlarge the uncompressed image at a specified magnification. According to an embodiment, if the image data needs to be enlarged according to the size of image data to be output on the display panel 200 or settings by a user, the up-scaler 470 may enlarge the image data. The image data enlarged by the up-scaler 470 may be transmitted to the display timing controller 490. If at least a portion of the image data needs not to be enlarged, the up-scaler 470 may be omitted or bypassed.

The image pre-processor 480 may improve the image quality of the image data. The image pre-processor 480 may include, for example, a pixel data processing circuit, a pre-processing circuit, a gating circuit, and the like.

The display timing controller 490 may control the timing of elements included in the DDI 400a. For example, the display timing controller 490 may adjust timing in which the image data received from the processor 300a is stored in the memory 450 and timing in which the image data stored in the memory 450 is read to prevent the timings from overlapping with each other. The display timing controller 490 may control timing of reading the image data stored in the memory 450 at a specified frame rate in response to the control of the command controller 430 and of transmitting the image data to the decoding module 460 and the up-scaler 470.

The display timing controller 490 may transmit the image data received from the image pre-processor 480 to a source driver 210 in response to the control of the command controller 430 and may control the output of a gate signal from a gate driver 220. According to an embodiment, the display timing controller 490 may be implemented as being included in the command controller 430. The display timing controller 490 may change image data, which is received from the memory 450 through the decoding module 460, the up-scaler 470, and/or the image pre-processor 480, to an image signal and may supply the image signal to the source driver 210 and the gate driver 220 of the display panel 200. The display timing controller 490 may transmit information on a frame rate of the image data, which is currently output on the display panel 200, to the DFFC 495. The display timing controller 490 may transform a reference signal, which is received from the outside, in the unit of a frequency corresponding to the frame rate transmitted by the command controller 430 and may transmit the transformed reference signal to the DFFC 495.

The DFFC 495 may determine the frame rate of the image data stored in the memory 450. For example, the DFFC 495 may receive information related to the frame rate from the command controller 430 and may receive a timing signal from the display timing controller 490. The DFFC 495 may control a read rate of the image data stored in the memory 450 and an output rate of the image data by using the timing signal received from the display timing controller 490 and the information related to the frame rate. The image data corresponding to the specified frame rate read by the DFFC 495 may be transmitted to the display timing controller 490 through at least one of the decoding module 460, the up-scaler 470, or the image pre-processor 480 or directly.

The display 160 may include the source driver 210, the gate driver 220, and the display panel 200. Additionally, the display 160 may further include a touch panel and a touch integrated circuit (IC), a pressure sensor and a pressure sensor IC, and a digitizer, which are related to a user input.

The display panel 200 may display various pieces of information (e.g., multimedia data or text data) to be provided for a user. The display panel 200 may include, for example, a liquid-crystal display (LCD), an active-matrix organic light-emitting diode (AM-OLED), or the like. For example, the display panel 200 may be implemented to be flexible, transparent, or wearable. For example, the display panel 200 may be included in a cover of a case electrically connected with the electronic device 100.

The display panel 200 may receive an image signal corresponding to image data from the DDI 400a and may display a screen based on the image data. In the display panel 200, a plurality of data lines and a plurality of gate lines cross each other and a plurality of pixels may be disposed at crossing areas between the gate lines and the data lines. In the case that the display panel 200 corresponds to an organic light-emitting diode (OLED) panel, the display panel 200 may include at least one switching device (e.g., field-effect transistor (FET)) and one OLED. Each pixel may produce light based on an image signal received from the DDI 400a at specified timing. For example, the display panel 200 may have wide quad high-definition (WQHD) resolution (2560×1440).

The source driver 210 and the gate driver 220 may generate signals to be supplied to a scan line and a data line of the display panel 200, which are not illustrated in drawings, based on the source control signal and the gate control signal received from the display timing controller 490, respectively.

As described above, in the electronic device 100 according to an embodiment of the present disclosure, the display controller 320 of the processor 300a may determine the image display state and may provide information related to a frame rate corresponding to the image display state to the DDI 400a while generating the image data. Alternatively, the electronic device 100 may determine the frame rate based on at least one of the type of an application and the generation state of a user input signal, and may output the image data at the determined frame rate. Among the above-described operations, the processor 300a may transmit the image data to the memory 450 at a specified frame rate (e.g., 60 Hz; the rate of transmitting one frame for 16.7 msec), and the DDI 400a may transmit the image data, which is stored in the memory 450, to the display panel 200 at a changed frame rate (e.g., 50 Hz; the rate of transmitting one frame for 20 msec).

Figure 4A:
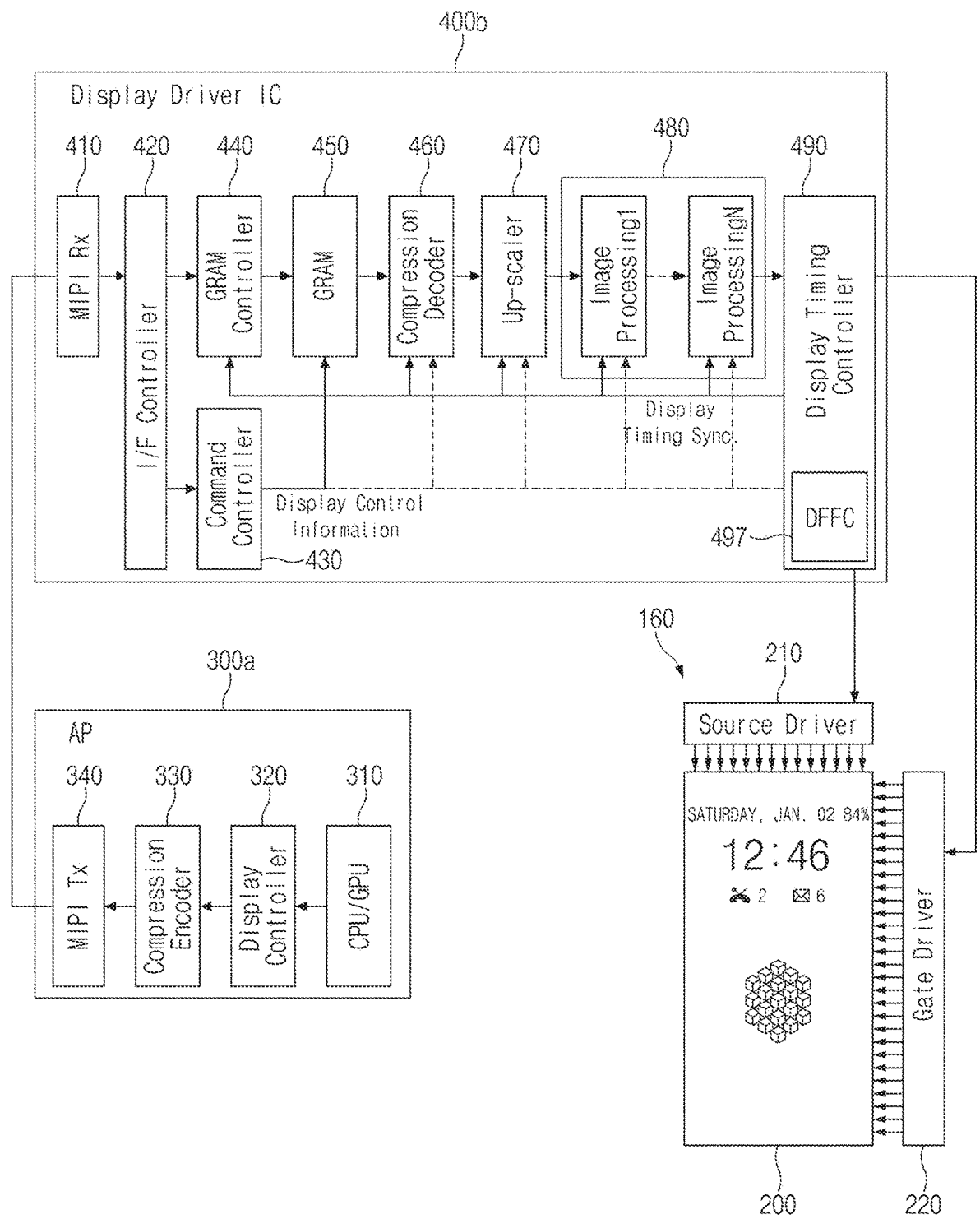
FIG. 4A is a view illustrating another example of some among elements of the electronic device according to an embodiment of the present disclosure.

FIG. 4A is a view illustrating another example of some among elements of the electronic device according to an embodiment of the present disclosure.

Referring to FIG. 4A, according to an embodiment of the present disclosure, the electronic device 100 may include a processor 300a, a DDI 400b, and a display 160. Among the elements of the electronic device 100 described above, the processor 300a and the display 160 may include elements substantially identical or similar to those of the processor and the display described with reference to FIG. 3.

The DDI 400b may include an internal receive interface 410, an interface controller 420, a command controller 430, a memory controller 440, a memory 450, a decoding module 460, an up-scaler 470, an image pre-processor 480, and a display timing controller 490.

The internal receive interface 410 may receive image data and/or information related to a frame rate from the processor 300a. The information related to the frame rate may include information determined based on the state of an image which is currently displayed. The interface controller 420 may transmit the received image data to the memory 450 through the memory controller 440. If the information related to the frame rate is received from the interface controller 420, the command controller 430 may transmit the information to the display timing controller 490. The command controller 430 may acquire at least a portion of image data stored in the memory 450 based on information related to the output of the image data received from the processor 300a and may transmit the at least a portion of the image data to the decoding module 460. After the image data decoded by the decoding module 460 is scaled to data in specified size through the up-scaler 470, the image pre-processor 480 may perform specified image processing.

The display timing controller 490 may change the received image data into a source signal and may transmit the source signal to the source driver 210. The display timing controller 490 may generate gate signals to be sequentially supplied to pixels of the display panel 200 while the source driver 210 supplies the source signal to the display panel 200. The display timing controller 490 may include a DFFC 497 (e.g., a hardware (H/W) processor or a logic circuit). For example, the DFFC 497 may be implemented in the form of a logic circuit and included in the display timing controller 490. Alternatively, the DFFC 497 may be mounted in the form of firmware of the display timing controller 490.

If receiving the information related to a frame rate from the command controller 430, the display timing controller 490 may determine whether the information related to the frame rate is matched with the currently-set frame rate. If the information related to the frame rate is not matched with the currently-set frame rate, the display timing controller 490 may perform a process related to the change of the frame rate through the DFFC 497.

The DFFC 497 may determine the received information related to the frame rate to determine a signal cycle related to a read operation for the memory 450. Then, the DFFC 495 may supply a timing signal to perform a read operation from the memory 450 based on the determined signal cycle. The timing signal may be generated, for example, by using a clock generator included in the DDI 400b or a clock received from the processor 300a. The memory controller 440 may control the read operation of image data from the memory 450 based on a signal transmitted by the display timing controller 490 and a signal transmitted by the command controller 430 such that the image data is transmitted to the display timing controller 490 at a specified frame rate.

According to various embodiments, the DDI 400b may determine the change of the image data stored in the memory 450 and may determine the change of the frame rate based on the variation degree of the image data. If the change of the frame rate is determined, the DDI 400b may perform a read operation from the memory 450 and may adjust the output rate of the image data, based on the determined frame rate. For example, at least one of the memory controller 440, the command controller 430, or the display timing controller 490 (e.g., the DFFC 497) may determine the change of the image data written in the memory 450. For example, the DFFC 497 may determine a header value of an image data packet received from the interface controller 420 or may determine a specified address value (e.g., a position that a 2Ch code value is stored) of the memory 450 to determine the change state of the 2Ch code value included in the header value. According to an embodiment, if an image data packet including a new 2Ch code value is not received within a specified time, the DFFC 497 may determine a present image as a still image, and may perform processing such that a lower frame rate is applied to the present image. If the image data packet including the new 2Ch is received in specified number or more within the specified time, the DFFC 497 may determine the present image as a moving picture, and may perform processing such that a higher frame rate is applied to the present image.

Figure 4B:
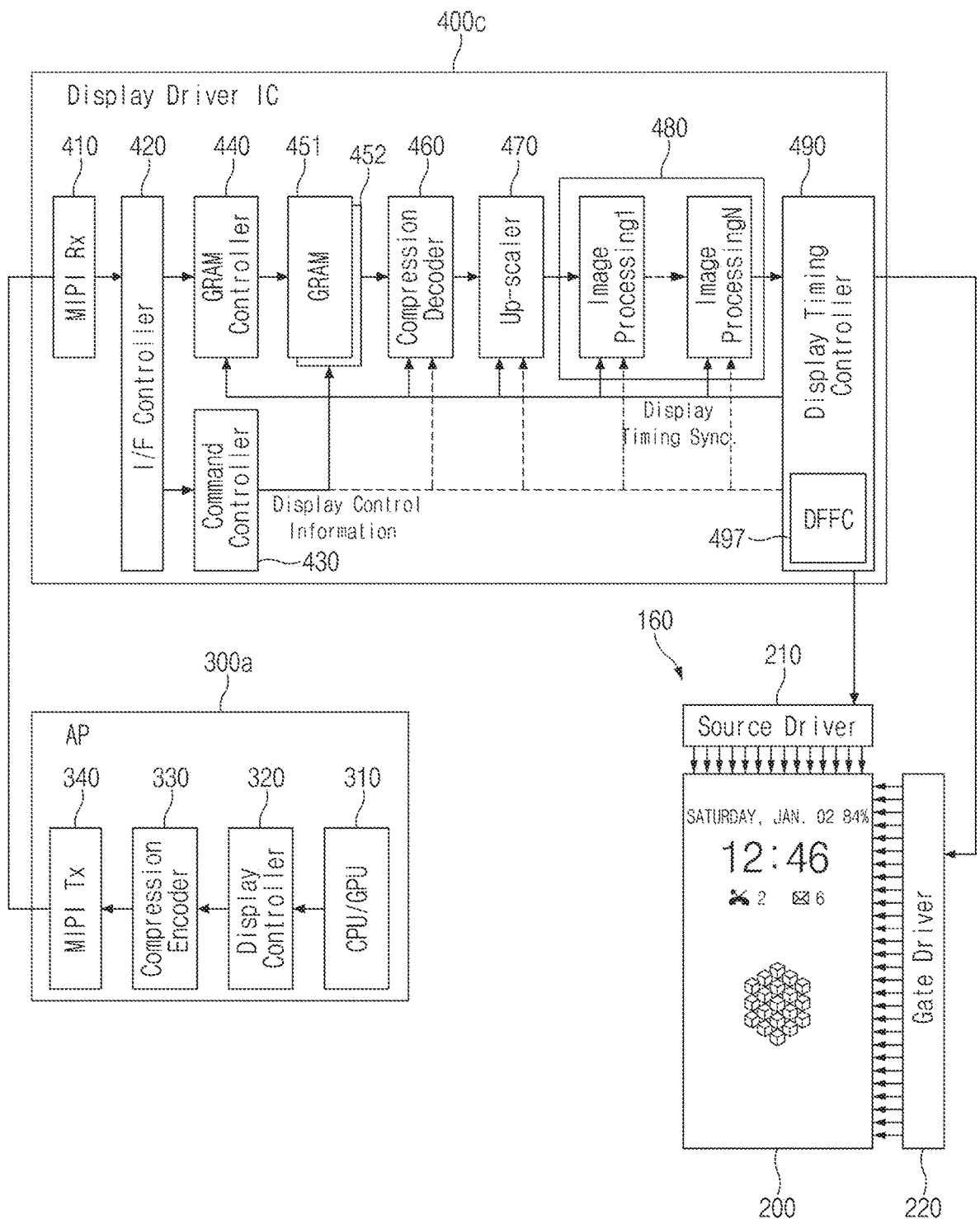
FIG. 4B is a view illustrating another example of elements of the electronic device according to an embodiment of the present disclosure.

FIG. 4B is a view illustrating still another example of elements of the electronic device according to an embodiment of the present disclosure.

Referring to FIG. 4B, according to an embodiment of the present disclosure, at least some elements of the electronic device 100 may include a processor 300a, a DDI 400c, and a display 160. Among elements of the electronic device 100 described above, the processor 300a and the display 160 may include elements substantially identical or similar to those of the processor and the display described with reference to FIG. 3.

The DDI 400c described above may include an internal receive interface 410, an interface controller 420, a command controller 430, a memory controller 440, a first memory 451, a second memory 452, a decoding module 460, an up-scaler 470, an image pre-processor 480, and a display timing controller 490 which supports the change of a frame rate.

If the memory controller 440 receives image data from the interface controller 420, the memory controller 440 may store the received image data in at least one (e.g., the first memory 451) of the first memory 451 or the second memory 452. If the memory controller 440 receives next image data, the memory controller 440 may store the received next image data in at least one (e.g., the second memory 452) of the first memory 451 or the second memory 452. As described above, the memory controller 440 may alternately store the received image data in the first memory 451 and the second memory 452.

The first memory 451 and the second memory 452 may include at least one of memories obtained by logically or physically dividing the above-described memory 450. The first memory 451 and the second memory 452 may be alternately used in an operation of storing or outputting image data.

The display timing controller 490 may include a DFFC 497 (e.g., at least one of software (S/W) or H/W). The DFFC 497 may compare information (e.g., 2Ch code information for indicating the update of image data contained in an nth frame) stored in the first memory 451 with information (e.g., 2Ch code information for indicating the update of image data in an (n+1)$^{th}$ frame) stored in the second memory 452. The DFFC 497 may be configured to read and output image data by employing a lower frame rate if data (e.g., 2Ch code information) in a specific address of the first memory 451 is identical to data (e.g., 2Ch code information) in a specific address of the second memory 452. The DFFC 497 may be configured to read and output image data by employing a higher frame rate if data (e.g., 2Ch code information) in the specific address of the first memory 451 is different from data (e.g., 2Ch code information) in the specific address of the second memory 452. In this operation, the DFFC 497 may determine a present image display state as a still image display state representing that no image change is made. In this operation, the DFFC 497 may determine a present image display state as a moving picture display state representing that image change is made.

Figure 5:
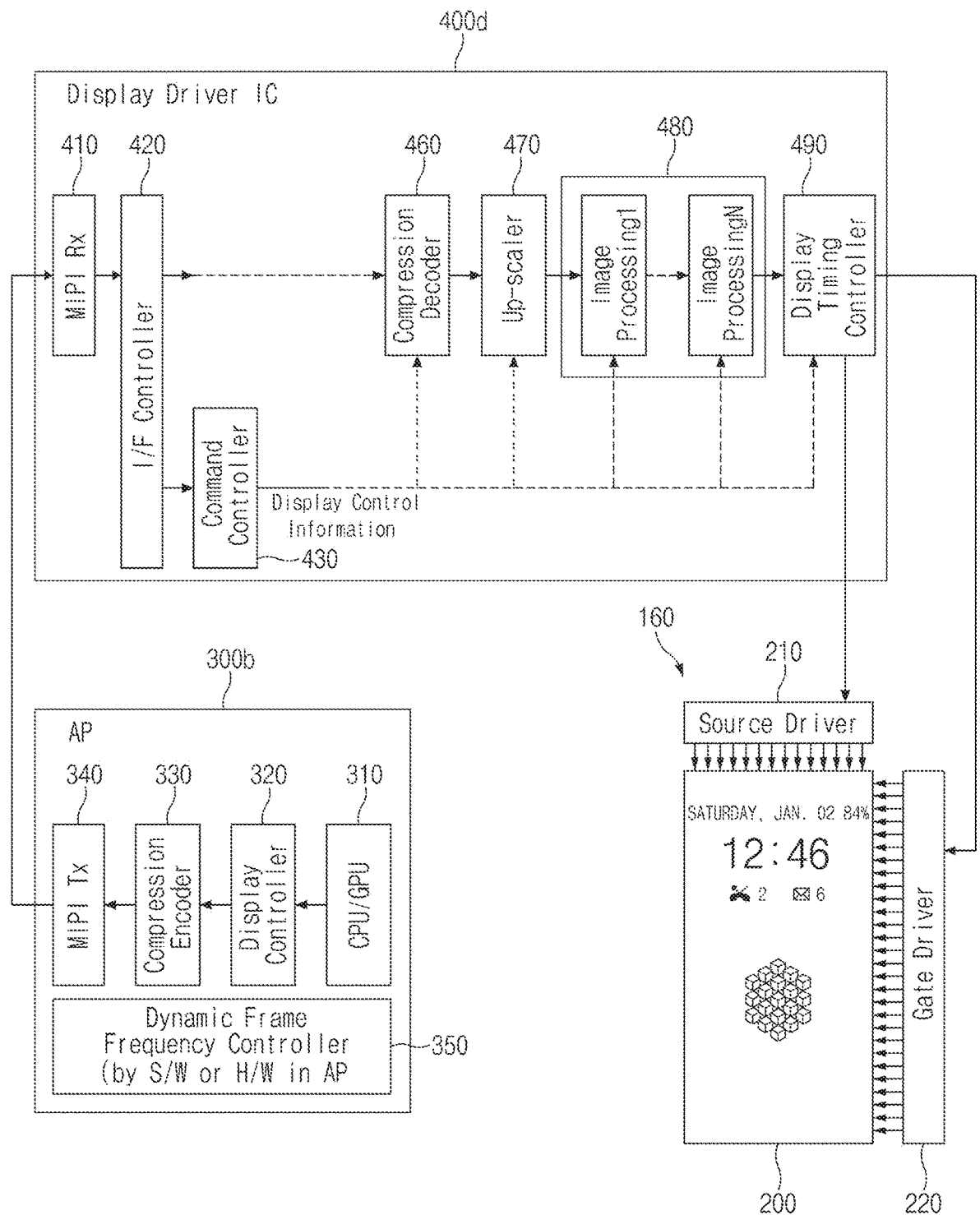
FIG. 5 is a view illustrating one example of elements of the electronic device for performing processor-based image processing according to an embodiment of the present disclosure.

FIG. 5 is a view illustrating an example of elements of the electronic device performing processor-based image processing according to an embodiment of the present disclosure.

Referring to FIG. 5, according to an embodiment of the present disclosure, at least some elements of the electronic device 100 may include a processor 300b including a DFFC 350, a DDI 400d, and a display panel 200.

The processor 300b may include a CPU/GPU 310, a display controller 320, a compression module 330, an internal transmit interface 340, and a DFFC 350. The DFFC 350 may be provided as at least one sub-processor in the form of hardware, or may be mounted or loaded in the form of S/W or firmware in the processor 300b.

The DFFC 350 mounted in the processor 300b may determine an image display state based on settings. Alternately, the DFFC 350 may be determine the image display state (e.g., an output state of a screen for an AOD function, an output state of a screen for a lock-screen function, an output state for a standby screen or home screen, an output state of a screen for a moving picture, or a progressing state of a screen change according to a user input) based on a function which is currently applied. The DFFC 350 may determine a frame rate corresponding to the image display state. For example, if the screen based on an AOD function is output, the DFFC 350 may determine the frame rate as a first frame rate which is a lower frame rate and may transmit the information related to the first frame rate to the display controller 320. For example, if the lock screen or home screen is output, the DFFC 350 may determine the frame rate as a second frame rate higher than the first frame rate and may transmit the information related to the second frame rate to the display controller 320. For example, if the screen change is made according to a moving picture or a user input, the DFFC 350 may determine the frame rate as a third frame rate higher than the second frame rate and may transmit the information related to the third frame rate to the display controller 320.

The display controller 320 may adjust the output rate of the image data, based on the frame rate received from the DFFC 350. For example, the display controller 320 may transmit one frame to the DDI 400d at the rate of 30 Hz or for 3.34 msec, based on the first frame rate. For example, the display controller 320 may transmit one frame to the DDI 400d at the rate of 55 Hz or for 18.2 msec, based on the second frame rate. For example, the display controller 320 may transmit one frame to the DDI 400d at the rate of 90 Hz or for 1.11 msec, based on the third frame rate. In this operation, the display controller 320 may be configured to compress the image data, which is based on the determined frame rate, in a specified compression ratio through the compression module 330 and then to transmit the image data to the DDI 400d.

The DDI 400d may include, for example, an internal receive interface 410, an interface controller 420, a command controller 430, a decoding module 460, an up-scaler 470, an image pre-processor 480, and a display timing controller 490.

The interface controller 420 may transmit image data, which corresponds to a frame rate determined based on the image display state received from the processor 300b, to the decoding module 460. The decoding module 460 may decode the image data corresponding to display control information (e.g., compression ratio information) transmitted by the command controller 430 and may transmit the decoded image data to the up-scaler 470. The up-scaler 470 may determine a scale corresponding to the display control information transmitted by the command controller 430 and may scale the image data according to the determined scale. The scaled data may be transmitted to the display timing controller 490 via the image pre-processor 480.

As described above, in the electronic device 100 according to an embodiment of the present disclosure, the processor 300b may be configured to control a frame rate by adaptively changing the frame rate or maintaining a present frame rate to employ the optimal frame rate according to the image display state. Accordingly, in the case of processing the image data at a lower frame rate, the electronic device 100 may more reduce power consumption as compared to the case of processing the image data at a higher frame rate.

According to various embodiments, the electronic device may include a display, a processor configured to process image data to be output on the display and a DDI configured to output the image data, which is transmitted by the processor, on the display, wherein the DDI is configured to determine whether to change a frame rate of an image corresponding to at least one of an image display state representing whether an image output on the display is a still image or a moving picture, a type of an application related to the image output on the display, or a user input received in relation to an image change and output the image data at a determined frame rate.

According to various embodiments, the processor may be configured to determine whether to update image data stored in a frame buffer and transmit control information related to the change of the frame rate to the DDI if the image data is updated.

According to various embodiments, the DDI may be configured to determine the control information received from the processor and change the frame rate based on the control information.

According to various embodiments, the processor may be configured to generate control information for requesting for processing the image data at a first frame rate for a duration that an image change is absent, if the application is an application in which the image change is absent for at least a specified time, generate control information for requesting for processing the image data at a second frame rate higher than the first frame rate, if the application is an application in which the image change less appears (or in which the image change appears below a predetermined threshold), and generate control information for requesting for processing the image data at a third frame rate higher than the second frame rate, if the application is an application in which the image change significantly appears (or in which the image change appears above the predetermined threshold).

According to various embodiments, the DDI may be configured to, when changing the frame rate, employ at least one of a manner of stepwise changing the frame rate from a previous frame rate to a next frame rate, a manner of changing the frame rate from the previous frame rate to the next frame rate at a time, a manner of linearly changing from the previous frame rate to the next frame rate, or a manner of non-linearly changing the frame rate from the previous frame rate to the next frame rate.

According to various embodiments, the DDI may be configured to, in relation to determination of the image display state, determine whether code information, which is to indicate an image data update and is contained in the image data transmitted by the processor, is received, and change the frame rate based on whether the code information is received.

According to various embodiments, the DDI may be configured to determine the frame rate to have different values depending on a number of times that the code information is received or a length of a time that the code information is consecutively received.

According to various embodiments, the DDI may be configured to output the image data at a first frame rate if the code information is consecutively received, and output the image data at a second frame rate lower than the first frame rate if the code information is stopped to be received.

According to various embodiments, the DDI may be configured to output the image data at a first frame rate if the code information is maintained in a non-reception state, and output the image data at a second frame rate higher than the first frame rate if the code information is received after the code information is in the non-reception state.

According to various embodiments, the DDI may be configured to, if a target frame rate value becomes smaller than a previous frame rate value, or if a transmission rate of one frame becomes more than a previous transmission rate, maintain duration that a gate signal or a source signal is supplied based on the changed frame rate while expanding a width of guard duration that the gate signal or the source signal is not supplied.

According to various embodiments, a DDI may include a receive interface configured to receive image data from a processor at a first frame rate, a memory configured to store the image data received at the first frame rate and a display timing controller configured to detect a variation of the image data stored in the memory, to change a frame rate for the image data, which is stored in the memory, based on the variation of the image data, and to output the image data on the display at the changed frame rate.

Figure 6:
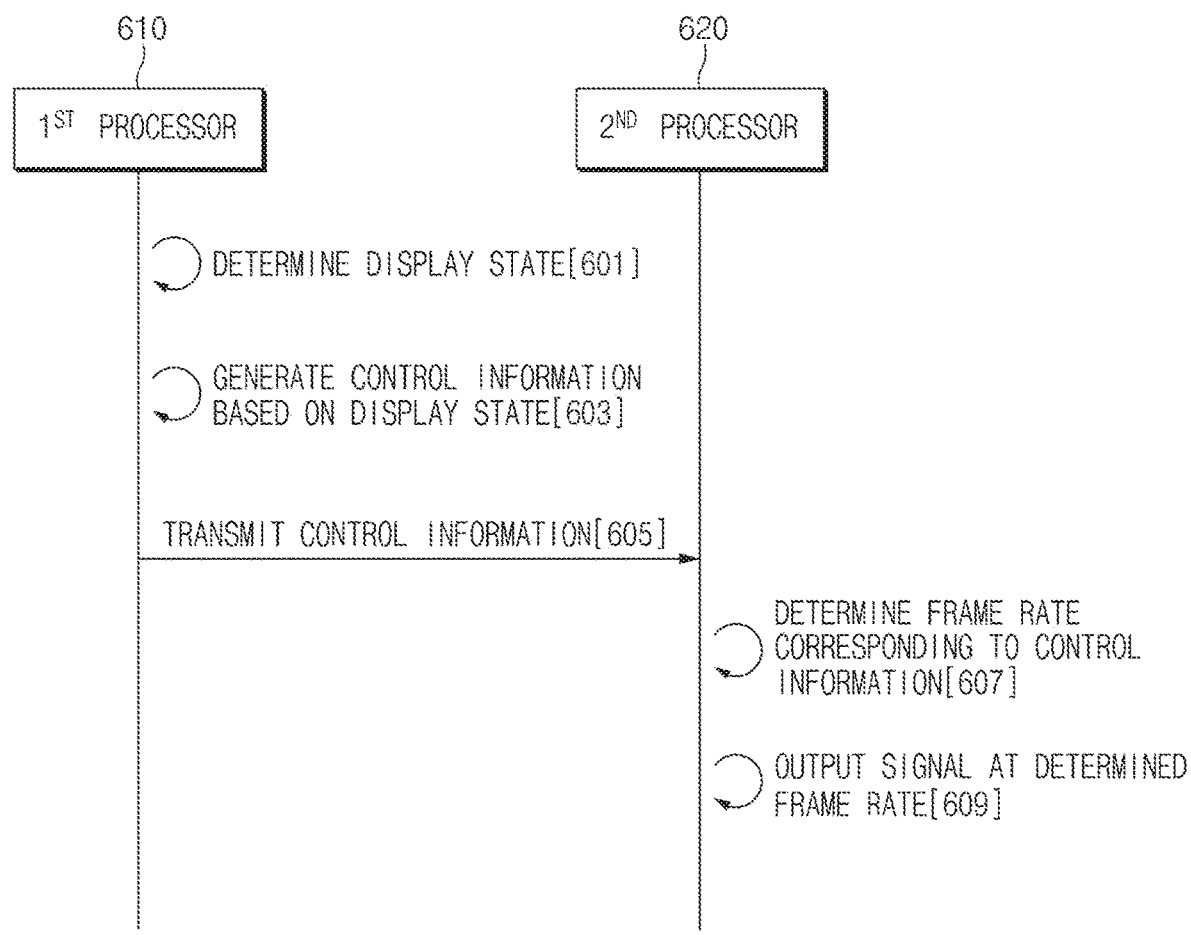
FIG. 6 is a view illustrating a signal flow related to display driving according to an embodiment of the present disclosure.

FIG. 6 is a view illustrating a signal flow related to display driving according to an embodiment of the present disclosure.

Referring to FIG. 6, according to an embodiment of the present disclosure, a display driving system may include a first processor 610 (e.g., the processor 300a or 300b) and a second processor 620 (e.g., the DDIs 400a, 400b, and 400c) The first processor 610 and the second processor 620 may be included in one electronic device (e.g., an electronic device packaged in one case or housing). Alternatively, the first processor 610 may be included in a first electronic device and the second processor 620 may be included in a second electronic device (or an electronic device having a separate case or housing) physically separated from the first electronic device. In the case that the first processor 610 and the second processor 620 are included in electronic devices distinguished therebetween, the electronic devices may employ communication interfaces that allow communication between the first processor 610 and the second processor 620.

In operation 601, the first processor 610 may determine an image display state. For example, the first processor 610 may determine the type of a displayed image by determining a function under execution or may determine an image variation by determining a memory (e.g., a frame buffer included in the processor 300a or operated by the processor 300a or 300b) related to display driving.

In operation 603, the first processor 610 may generate control information based on the image display state. For example, in the case that at least a portion of a screen includes a moving picture or a dynamic object (that moves on the screen according to a user input or program settings), the first processor 610 may generate the control information set to output image data at a higher frame rate. For example, in the case that the screen is based on a still image or has a change within a specific extent (e.g., a screen change according to a text input or a time display change by the lapse of time), the first processor 610 may generate control information set to output image data at a lower frame rate.

In operation 605, the first processor 610 may transmit the control information to the second processor 620. In this operation, the first processor 610 may transmit the image data related to the control information to the second processor 620. The control information may be generated and transmitted in the unit of one frame. In addition, the control information may be transmitted in the period of time that the frame rate needs to be changed.

In operation 607, the second processor 620 may determine the frame rate corresponding to the control information. In operation 609, the second processor 620 may output a signal at the determined frame rate. For example, the second processor 620 may store image data received at a specific frame rate in a memory (e.g., a memory (GRAM) of the DDIs 400a, 400b, 400c, or 400d)) and may adjust the rate of outputting the image data based on the determined frame rate. In this operation, the second processor 620 may change image data to be suited to a frame rate, which is change-requested, by controlling a memory read rate or by adjusting the rate of transmitting the read image data in the course of transmitting the read image data. The image data (e.g., image data having changed Vsync and Hsync signals) having a changed frame rate may be transmitted to a source driver and a gate driver, and may be changed into a source signal and a gate signal corresponding to a relevant synchronization signal to be supplied to a display panel 200.

Figure 7:
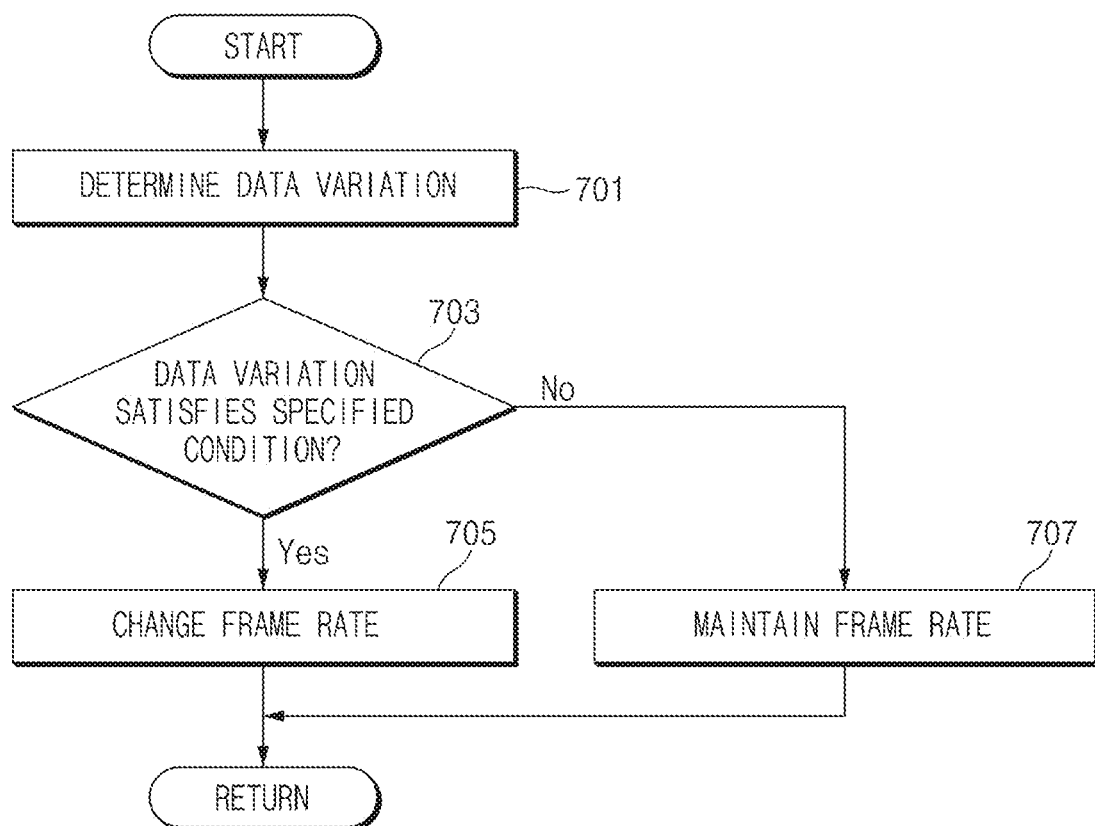
FIG. 7 is a view illustrating another example of a display driving method according to an embodiment of the present disclosure.

FIG. 7 is a view illustrating another example of a display driving method according to an embodiment of the present disclosure.

Referring to FIG. 7, according to an embodiment of the present disclosure, regarding the display driving method of a DDI, in operation 701, a DDI 400 (e.g., the DDI 440a, 400b, 400c, or 400d which is collectively referred to as "DDI 400") may determine the variation of image data. For example, the DDI 400 may determine the variation of the image data by checking header information of a starting packet of the image data (e.g., a packet including 2Ch code information for notifying the starting packet of the image data and a packet including 3Ch code information subsequent to the starting packet) transmitted by a processor 300 (e.g., the processor 300a or 300b which is collectively referred to as "processor 300"). In the case that the image data is changed, the starting packet of a present frame may have a value different from that of a previous packet.

In operation 703, the DDI 400 may determine whether the variation of the image data satisfies a specified condition. The specified condition may include a condition that the change of the image data occurs. If the variation of the image data satisfies the specified condition, the DDI 400 may change a frame rate in operation 705. For example, if a moving picture is changed to a still image, the DDI 400 may change a present frame rate to a frame rate lower than a previous frame. If the still image is changed to the moving picture, the DDI 400 may change the present frame rate to a frame rate higher than the previous frame. If the variation of the image data fails to satisfy the specified condition, the DDI 400 may maintain the present frame rate in operation 707.

Figure 8A:
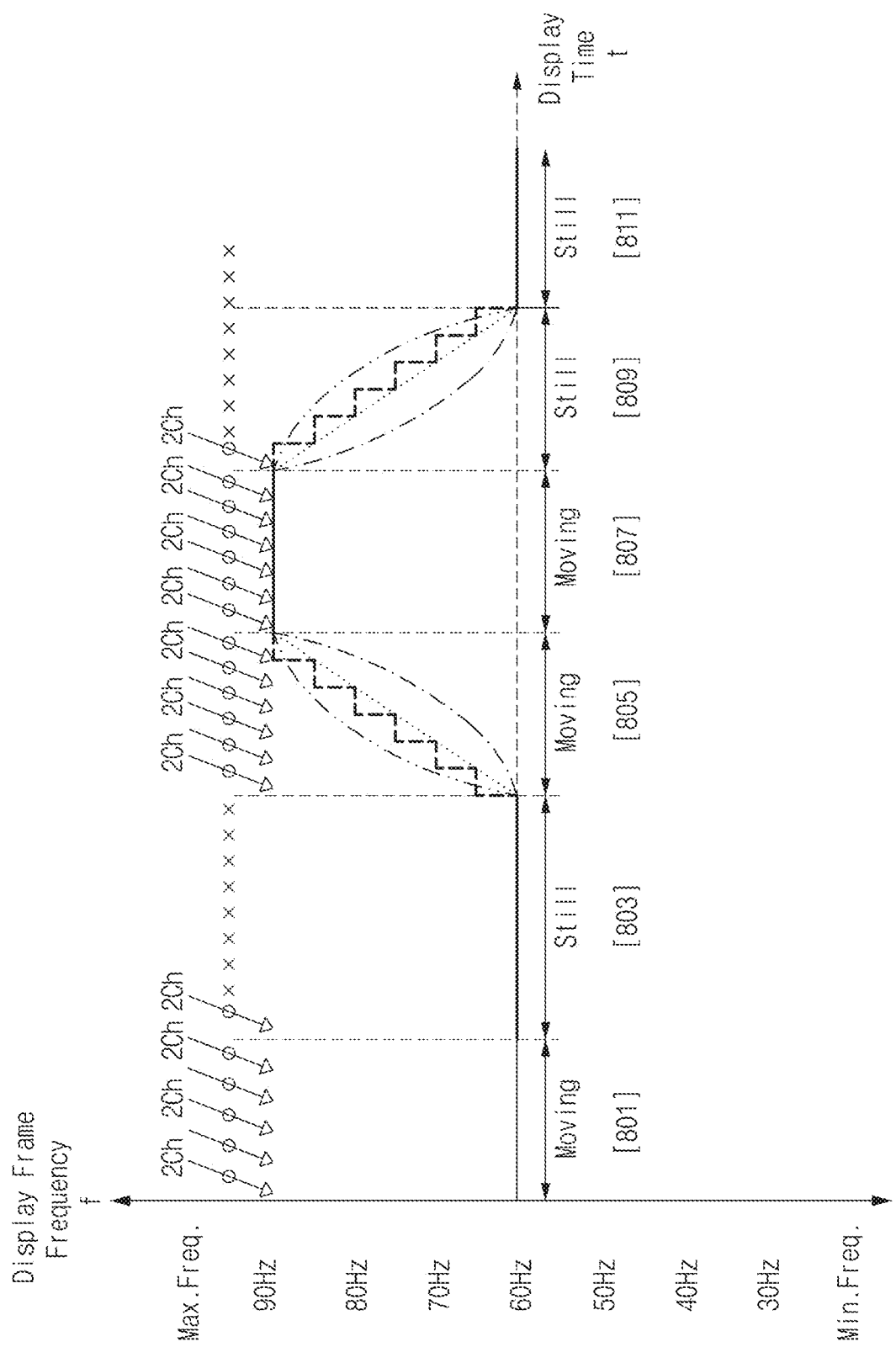
FIG. 8A is a view illustrating one example of display driving according to an embodiment of the present disclosure.

FIG. 8A is a graph illustrating one example of display driving according to an embodiment of the present disclosure.

Referring to FIG. 8A, in duration 801, the DDI 400 may consecutively receive starting packets '2Ch' representing a new image frame from the processor 300. If the DDI 400 consecutively receives the starting packet '2Ch', the DDI 400 may determine a moving picture as being reproduced and may maintain a present frame rate (e.g., 60 Hz).

In duration 803, if the DDI 400 fails to receive a new starting packet after receiving the starting packets '2Ch' at the previous frame, the DDI 400 may determine an image display state as the still image display state. In this operation, even though the image display state is the still image display state, the DDI 400 may determine whether the starting packets '2Ch' are received for a specified duration while maintaining the previous frame rate (e.g., 60 Hz). According to various embodiments, the DDI 400 may variously adjust a time to maintain the frame rate (frame rate maintaining time) in the still image display state, depending on a duration that a previous moving picture display state is maintained. For example, if a previous moving picture display time is maintained for a first moving picture display time, the DDI 400 may process, as a first frame rate maintaining time, a frame rate maintaining time in the still image display state that the starting packets are not received. If the previous moving picture display time is maintained for a second moving picture display time (e.g., a display time shorter than the first moving picture display time), the DDI 400 may process, as a second frame rate maintaining time, a frame rate maintaining time (e.g., a time shorter than the first frame rate maintaining time) in the still image display state in which the starting packets are not received.

In duration 805, if receiving a starting packet '2Ch', the DDI 400 may change the frame rate (e.g., 60 Hz) to a specified frame rate (e.g., 90 Hz) based on the reception of the starting packet '2Ch'. For example, the DDI 400 may change the frame rate at a time (e.g., 60 Hz→90 Hz), may change the frame rate by increasing the frame rate with a specific increment (e.g., 60 Hz→66 Hz→72 Hz→78 Hz→84 Hz→70 Hz), may change the frame rate in a non-linear manner (e.g., 60 Hz→62 Hz→64 Hz→70 Hz→78 Hz→90 Hz), or may change in a linear manner (e.g., if 60 Hz→90 Hz, the size of the frequency is increased gradually, for example, by the increment of 1 Hz or 0.5 Hz).

In operation 807, if the DDI 400 consecutively receives the starting packets '2Ch', the DDI 400 may maintain the changed frame rate (e.g., 90 Hz). If the receiving of the starting packets '2Ch' is stopped, the DDI 400 may change the frame rate (e.g., 90 Hz), which is currently applied, to a previous frame rate (e.g., 60 Hz) in operation 809. In this operation, the DDI 400 may change the frame rate in a manner inverse to a manner applied in operation 805.

In duration 811, the DDI 400 may determine this duration as the duration for a sill image as the starting packet '2Ch' is not received and may maintain the previous frame rate (e.g., 60 Hz).

As described above, the DDI 400 may output image data at a higher frame rate only in the duration that the higher frame rate is required. The DDI 400 may output image data at a specified frame rate in the duration that the starting packet '2CH' is not received. Accordingly, image quality may be improved in content, such as a game, requiring a rapid image change, and power may be saved.

In the above description, the DDI 400 may differently apply frame rate up-change and frame rate down-change. For example, in the case of the frame rate up-change, since the eyes of a user may be relatively insensitive to the change in the improvement of image quality, the DDI 400 may be able to change the frame rate at a time. In the case of the frame rate down conversion, since the eyes of the user may be sensitive to a frame change, the DDI 400 may linearly change the frame rate. The above-described change of the frame rate may be varied with physical properties such as the size and the response speed of a display.

The DDI 400 may increase or decrease a frame rate based on a previous image display state when changing the frame rate. For example, after the moving picture has been displayed at the frame rate of 60 Hz, the DDI 400 may display a still image for a first time without changing the frame rate. Thereafter, if the DDI 400 consecutively receives starting packets '2Ch', the DDI 400 may determine that a function necessary for processing a high-rate frame as in a game is executed and may change a present frame rate to a frame rate higher than a previous frame rate (e.g., 60 Hz).

In addition, for example, after the moving picture has been displayed at the frame rate of 60 Hz, the DDI 400 may display a still image for a second time (e.g., a time shorter than the first time). Thereafter, if the starting packets '2Ch' are received, the DDI 400 may determine that a general moving picture is reproduced and may maintain the previous frame rate (60 Hz).

According to various embodiments, the DDI 400 may change the frame rate under the control of the processor 300. The processor 300 may determine the adjustment in the size of the frame rate corresponding to the type of a function under execution. For example, during the output of a still image such as an AOD screen, the processor 300 may control the DDI 400 to output image data at the first frame rate (e.g., 30 Hz). During the output of a still image, such as a home screen, specified through a user input after the AOD screen has been output, the processor 300 may control the DDI 400 to output image data at the second frame rate (e.g., 60 Hz). If a moving picture is output or screen scrolling occurs due to a user input after the home screen has been output, the processor 300 may control the DDI 400 to output image data at a third frame rate (e.g., 90 Hz).

Although the above description has been made in that the frame rate is changed up from 60 Hz to 90 Hz, the present disclosure is not limited thereto. For example, the processor (or DDI) may change up the frame rate, in detail, may change the frame rate from 60 Hz to 70 Hz, or from 60 Hz to 80 Hz according to settings. In addition, the processor (or the DDI) may change the frame rate to a still higher frame rate based on the size in the image variation, the type of an application, the size of a user input, or the like. For example, when an application, such as a game, is executed, the processor (or the DDI) may employ the frame rate change of 60 Hz to 90 Hz. When a web-page is displayed, the processor (or the DDI) may employ the frame rate change of 60 Hz to 70 Hz. When accessing a specified site (e.g., Youtube) in the web-page, the processor (or the DDI) may employ higher frame rate change (e.g., the frame rate change of 60 Hz to 90 Hz).

Figure 8B:
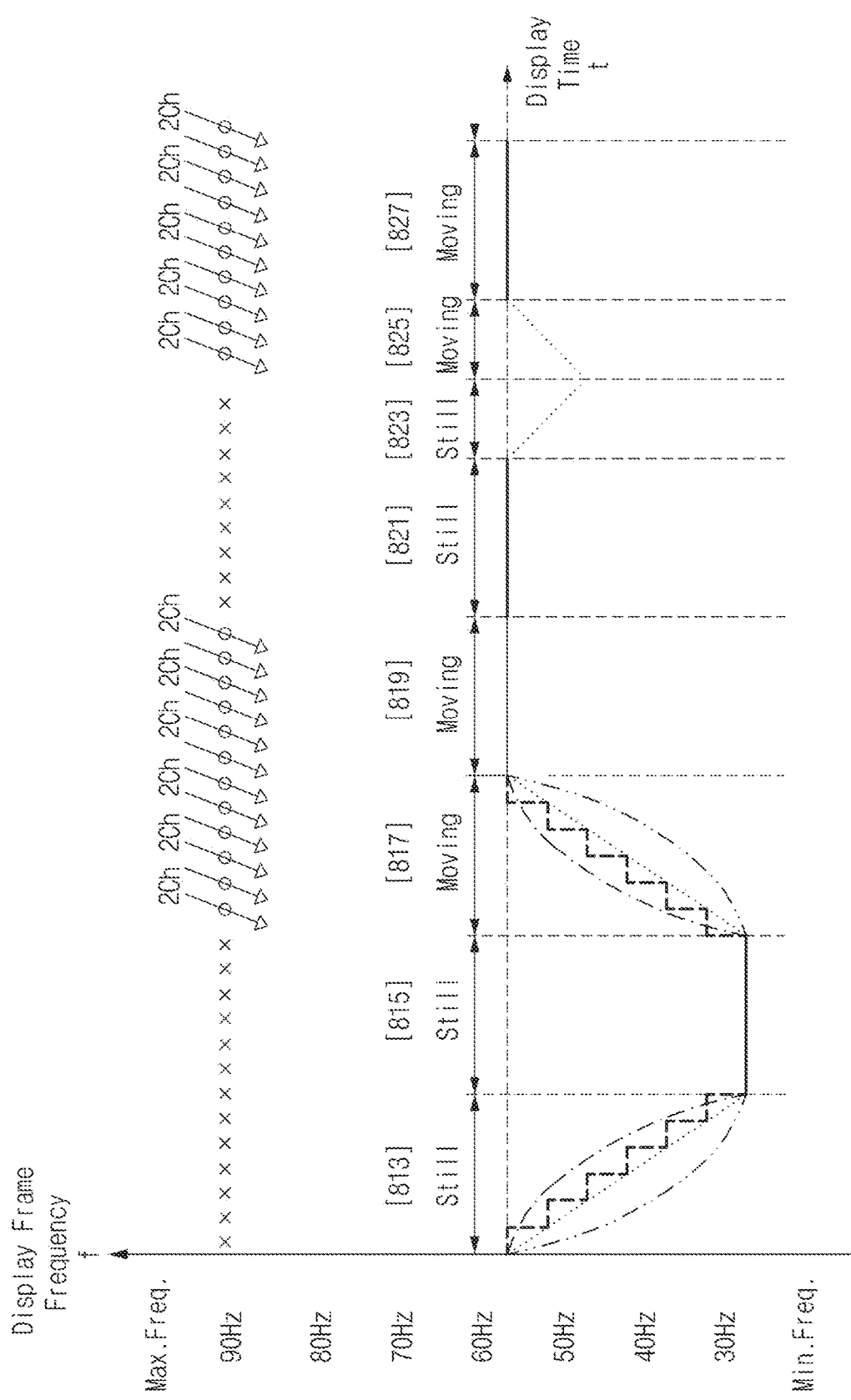
FIG. 8B is a view illustrating another example of display driving according to an embodiment of the present disclosure.

FIG. 8B is a view illustrating another example of display driving according to an embodiment of the present disclosure.

Referring to FIG. 8B, in duration 813, the DDI 400 may determine an image display state as a still image display state as a starting packet 2Ch representing a new image frame from the processor 300 is not received. The DDI 400 may change the present frame rate (e.g., 60 Hz) to a lower frame rate (e.g., 30 Hz) as the starting packet '2Ch' is not received. In the course of changing the frame rate, the DDI 400 may change the frame rate at one time (e.g., 60 Hz→30 Hz), may change the frame rate by decreasing the frame rate with a specific decrement (e.g., 60 Hz→54 Hz→48 Hz→42

Hz→36 Hz→30 Hz), may change the frame rate in a non-linear manner (e.g., 60 Hz→50 Hz→42 Hz→34 Hz→32 Hz→30 Hz, or may change the frame rate in a linear manner (e.g., if 60 Hz→30 Hz, the size of the frequency is decreased gradually, for example, by the decrement of 1 Hz or 0.5 Hz).

In duration 815, the DDI 400 may determine the image display state as the sill image display state as the starting packet '2Ch' is not received and may maintain a display state corresponding to the changed present frame rate (e.g., 30 Hz). In duration 817, the DDI 400 may change the present frame rate (e.g., 30 Hz) to a specified frame rate (e.g., 60 Hz) as starting packets '2Ch' are consecutively received. In this operation, the DDI 400 may change the frame rate in any one of manners applied in operation 813. In addition, the DDI 400 may employ a manner of changing the frame rate at a time (e.g., 30 Hz→60 Hz) among manners of changing up the frame rate. The DDI 400 may employ a manner of linearly changing the frame rate among the manners of changing down the frame rate.

In duration 819, the DDI 400 may determine the image display state as a moving picture display state as the starting packets '2Ch' are consecutively received and may process image data output according to the changed frame rate (e.g., 60 Hz). In duration 821, as the starting packet '2Ch' is not received, the DDI 400 may maintain a previous frame rate (e.g., 60 Hz), even though the starting packet '2Ch' is maintained in a non-reception state for a specified time. If the DDI 400 fails to receive the starting packet 2Ch after the specified time has elapsed, the DDI 400 may change the frame rate (e.g., 60 Hz→30 Hz) in duration 823. In the operation of changing the frame rate, the DDI 400 may change the present frame rate to a target frame rate according to a stepwise manner, a linear manner, or a non-linear manner.

If the starting packet '2Ch' is received as illustrated in duration 825 during the change of the frame rate, the DDI 400 may stop changing (e.g., 60 Hz→55 Hz) the frame rate or may change the frame rate to the previous frame rate again (e.g., 55 Hz→60 Hz). After the frame rate has been recovered (e.g., 60 Hz), if the starting packets '2Ch' are consecutively received as illustrated in duration 827, the DDI 400 may process the output of image data at the changed frame rate (e.g., 60 Hz). The DDI 400 may change the frame rate in at least one of the linear change manner, the non-linear change manner, and the stepwise change manner in durations 823 and 825.

The determination of the image display state in the above description may be performed or omitted based on the reception of the starting packet '2Ch'. For example, the DDI 400 may omit the determination of the image display state and may change or maintain the frame rate depending on whether the starting packet 2Ch is received, depending on whether the starting packets 2Ch are consecutively received, depending on the length of the time in which the starting packets 2Ch are consecutively received.

According to various embodiments, the DDI 400 may variously change the frame rate depending on the variation of a consecutive image data packet '3Ch'. For example, if there is no the variation in the consecutive image data packet '3Ch', the DDI 400 may output image data at the first frame rate (e.g., 30 Hz). If the variation of the consecutive packets '3Ch' is within a first range, the image data is output at the second frame rate (e.g., 60 Hz). If the variation of the consecutive packets '3Ch' exceeds the first range, the image data may be output at the third frame rate (e.g., 90 Hz). In this case, the DDI 400 may detect the variation in at least one of consecutive image data packets '3Ch' of image data stored in the memory (e.g., GRAM) 3Ch' at every specified time (e.g., a period for updating image data). In addition, the DDI 400 may compare consecutive image packets '3Ch', which are positioned at the same locations, of image data stored in a plurality of memory regions to detect an image change. According to various embodiments, the DDI 400 may detect the variation of consecutive image data packets '3Ch' if the frame rate needs to be changed (e.g., if the starting packet '2Ch' is not received and then received) and may vary the target frame rate based on the detected variation of the consecutive image data packets '3Ch' (e.g., 60 Hz→90 Hz based on the image variation).

Regarding the case that the starting packet '2Ch' is not received, the DDI 400 may determine the image display state as the still image output state if the starting packet 2Ch is not received within a specified time (e.g., the update period of the specified image data, the integer multiple of 16.7 msec in the case of 60 Hz, or the integer multiple of 20 msec in the case of 50 Hz) after receiving the previous starting packet '2Ch'. In addition, if the starting packets '2Ch' are received in a specified number or more after the starting packets '2Ch' are received, the DDI 4000 may determine the image display state as the moving picture display state and may change the frame rate.

Although the above description has been made in that the frame rate is changed down from 60 Hz to 30 Hz, the present disclosure is not limited thereto. For example, the processor (or DDI) may change down the frame rate, in detail, may change the frame rate from 60 Hz to 50 Hz, or from 60 Hz to 40 Hz according to settings. In addition, the processor (or the DDI) may change the frame rate to a still lower frame rate based on the size in the image variation, the type of an application, the size of a user input, or the like. For example, when an application, such as chatting or document writing, is executed, the processor (or the DDI) may employ the frame rate change of 60 Hz to 50 Hz. When an application such as a novel or a text document is executed, the processor (or the DDI) may employ the frame rate change of 60 Hz to 40 Hz.

According to various embodiments, a display driving method may include determining at least one of an image display state representing whether an image output to a display is a still image or a moving picture, a type of an application related to the image output on the display, or a user input received in relation to a change of the image output on the display, changing a frame rate corresponding to the determining of the at least one of the image display state, the type of the application, or the user input, and outputting image data on the display at the changed frame rate.

According to various embodiments, a display driving method may further include determining, by a processor, whether image data stored in a frame buffer is updated and transmitting, by the processor, control information related to the changing of the frame rate to a DDI, if the image data stored in the frame buffer is updated.

According to various embodiments, the changing of the frame rate may include determining, by the DDI, the control information received from the processor and changing the frame rate based on the control information.

According to various embodiments, the display driving method may further include at least one of generating, by a processor, control information for requesting for processing image data at a first frame rate in duration that the image change is absent, if the application is an application in which the image change is absent for at least a specified time, generating, by the processor, control information for requesting for processing the image data at a second frame rate higher than the first frame rate, if the application is an application in which the image change less appears (or in which the image change appears below a first predetermined threshold), and generating, by the processor, control information for requesting for processing the image data at a third frame rate higher than the second frame rate, if the application is an application in which the image change significantly appears (or in which the image change appears above a second predetermined threshold which is different from or same with the first predetermined threshold).

According to various embodiments, the changing of the frame rate may include at least one of gradationally changing the frame rate from a previous frame rate to a next frame rate changing the frame rate from the previous frame rate to the next frame rate at a time, linearly changing from the previous frame rate to the next frame rate, or non-linearly changing the frame rate from the previous frame rate to the next frame rate.

According to various embodiments, the changing of the frame rate may include in relation to determination of the image display state, determining, by a DDI, whether code information, which is to indicate an image data update and is contained in image data transmitted by the processor, is received and changing the frame rate based on whether the code information is received.

According to various embodiments, the changing of the frame rate may further include outputting the image data at a first frame rate if the code information is consecutively received and outputting the image data at a second frame rate lower than the first frame rate if the code information is stopped to be received.

According to various embodiments, the outputting image data may further include outputting the image data at a first frame rate if the code information is maintained in a non-reception state, and outputting the image data at a second frame rate higher than the first frame rate if the code information is received after the code information is in the non-reception state.

According to various embodiments, the display driving method may further include, if the frame rate is changed to become smaller than a previous frame rate, or if a transmission rate of one frame is increased, maintaining duration that a gate signal or a source signal is supplied based on the changed frame rate while expanding a width of guard duration that the gate signal or the source signal is not supplied.

Figure 9:
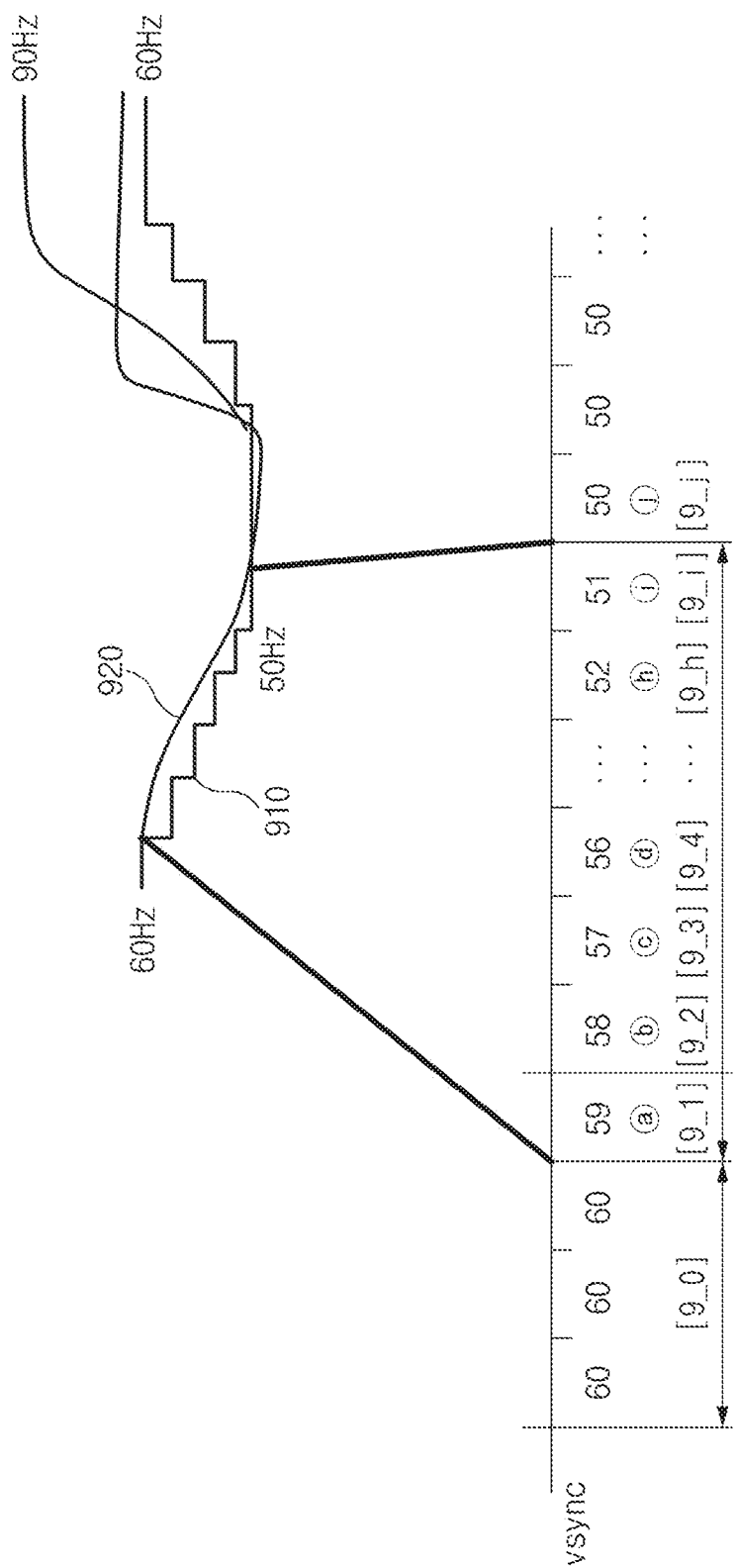
FIG. 9 is a view illustrating one example of the change of a frame rate according to an embodiment of the present disclosure.

FIG. 9 is a view illustrating one example of the change of a frame rate according to an embodiment of the present disclosure.

Referring to FIG. 9, in duration 9_0, the DDI 400 may output image data at a specified frame rate (e.g., 60 Hz). If an event occurs (e.g., a starting packet of image data stored in the memory (GRAM) is not received) in relation to the change of the frame rate, the DDI 400 may change a present frame rate (e.g., 60 Hz) to a specified frame rate (e.g., 50 Hz). In this case, in duration 9_1, the DDI 400 may change the present frame rate (e.g., 60 Hz) to a first frame rate (e.g., 59 Hz). In this operation, the DDI 400 may maintain the change duration of the first frame rate for a period of 'a'. Similarly, in duration 9_2, the DDI 400 may change the first frame rate (e.g., 59 Hz) to a second frame rate (e.g., 58 Hz) and may maintain the second frame rate for a period of 'b'. In duration 9_3, the DDI 400 may change the second frame rate (e.g., 58 Hz) to a third frame rate (e.g., 57 Hz) and may maintain the third frame rate for a period of 'c'. In duration 9_4, the DDI 400 may change the third frame rate (e.g., 57 Hz) to a fourth frame rate (e.g., 56 Hz) and may maintain the fourth frame rate for a period of 'd'. In duration 9_h, the DDI 400 may change the previous frame rate (e.g., 53 Hz) to an $h^{th}$ frame rate (e.g., 52 Hz) and may maintain the $h^{th}$ frame rate for a period of 'h'. In duration 9_i, the DDI 400 may change the $h^{th}$ frame rate (e.g., 52 Hz) to an $i^{th}$ frame rate (e.g., 51 Hz) and may maintain the $i^{th}$ frame rate for a period of T. In duration 9_j, the DDI 400 may change the $i^{th}$ frame rate (e.g., 51 Hz) to a $j^{th}$ frame rate (e.g., 50 Hz) and may maintain the $j^{th}$ frame rate for a period of T. Thereafter, the DDI 400 may output image data at the $j^{th}$ frame rate, which is changed, for the duration that the starting packet is not received. Additionally, the DDI 400 may perform the change to a specified frame rate (e.g., 60 Hz to 90 Hz) as the starting packet is received.

According to the manner of changing the frame rate, the DDI 400 may determine different weights with respect to the time of 'a', 'b', 'c', 'd', . . . 'h', and 'I', thereby adjusting the manner of changing the frame rate. For example, if the time of 'a', 'b', 'c', 'd', . . . 'h', and 'i' is uniformly determined, the DDI 400 may change the frame rate in a stepwise manner 910 or a linear manner 920. If the size of the time of 'a', 'b', 'c', 'd', . . . 'h', and 'i' is non-linearly adjusted (e.g., if the greatest time is set to the time of 'a' and the least time is set to the time of T among total times), the DDI 400 may change the frame rate in the non-linear manner.

Figure 10:
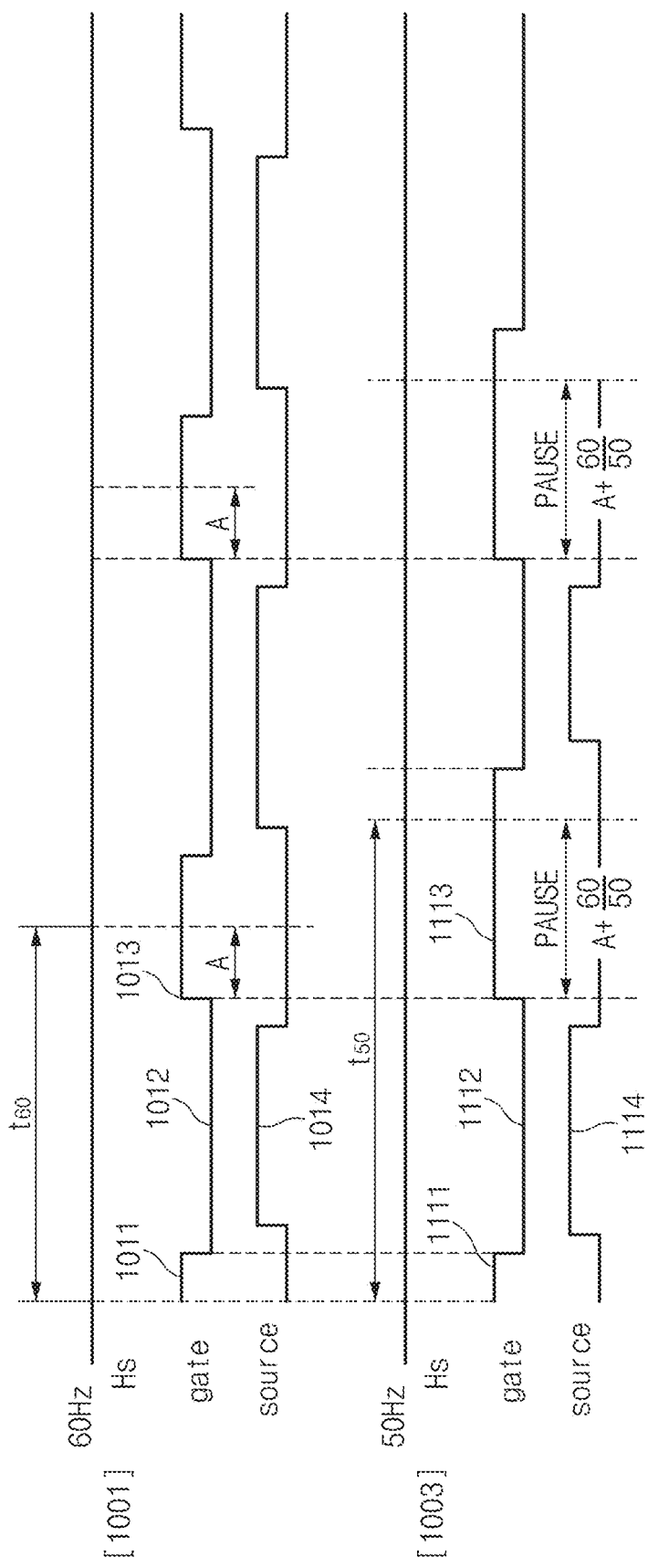
FIG. 10 is a view illustrating one example of display driving according to a changed frame rate according to an embodiment of the present disclosure.

FIG. 10 is a view illustrating one example of display driving according to a changed frame rate according to an embodiment of the present disclosure.

Referring to FIG. 10, in the case that the DDI 400 processes image data at the rate of 60 Hz, the DDI 400 may supply one horizontal sync signal Hs corresponding to one frame for the duration of $t_{60}$, may sequentially supply first gate signals to gate lines, and may sequentially supply first source signals to data lines as illustrated in state 1001. Although a first gate signal is illustrated in one square wave form in FIG. 10, it may be understood to a person skilled in the art that the first gate signal includes a plurality of square waves sequentially supplied to the gate lines. In addition, although a first source signal is illustrated in one square waveform in FIG. 10, the signal form may be varied corresponding to the image data supplied to the data lines. For example, if the image data is the string of 1, 0, 1, 1, . . . the first source signal is generated and supplied with voltage values corresponding to image data values 1, 0, 1, 1 . . . .

The first gate signal is a signal supplied to, for example, a P type transistor. While a LOW signal is supplied, the transistor is turned on and supports the light emission by the source signal. While a HIGH signal is supplied, the transistor may be turned off. The phase of the first gate signal may be varied depending on the type of a transistor (or MOS transistor). The first gate signal may include a first gate signal duration 1012 corresponding to a turn-on duration of the transistor and first guard durations 1011 and 1013 (e.g., a front porch and a back porch) arranged at both sides of the signal duration. The first guard durations 1011 and 1013 may include durations related to response speeds required when the transistor is turned on or turned off. The first guard durations 1011 and 1013 may correspond to the duration that the transistor is turned off for the durations of 2A. The duration of A may be varied depending on the response speed of the transistor of the display 160, the widths of the square waves of the gate signals, or the like.

According to various embodiments, the size of the first gate signal duration 1012 may be fixed regardless of the frame rate of the image data. For example, if the DDI 400 processes image data at the rate of 50 Hz, a horizontal sync signal (Hs), a second gate signal, and a second source signal may be supplied corresponding to one frame for the duration of $t_{50}$ longer than the duration of $t_{60}$ as illustrated in state 1003. The second gate signal may include a second gate signal duration 1112 and second guard durations 1111 and 1113. The length of the gate signal duration 1112 may be formed to be substantially equal to or approximate to the length of the first gate signal duration 1012. Accordingly, the second guard durations 1111 and 1113 may be formed with lengths longer than lengths of the first guard durations 1011 and 1013. Accordingly, if the image data is processed at the frame rate of 50 Hz, the DDI 400 may output image data for a longer pause period (e.g., the duration that the gate signal is not supplied or the transistor is turned off) as compared with the case that the image data are processed at the frame rate of 60 Hz. The second guard durations 1111 and 1113 may have time widths increased due to the driving at 50 Hz in addition to the width of the guard durations applied in the driving at 60 Hz. For example, if one frame is processed for 16.7 msec in the driving at 60 Hz, the second guard durations 1111 and 1113 may be allocated with lengths which are 3.3 msec (20 msec-16.7 msec) longer than those of the first guard durations 1011 and 1013. The length of the source signal duration 1114 may be formed to be substantially equal to or approximate to the length of the first source signal duration 1014. Accordingly, the pause duration (corresponding to the duration that the second source signal duration 1114 is applied) of the signal applied to the data line in driving at 50 Hz may have a length longer than that of the pause duration (corresponding to the duration that the first source signal duration 1014 is not supplied) of a signal applied to the data line in driving at 60 Hz.

The DDI 400 may be optimized to the characteristic of the display panel 200 provided to process one frame for 16.7 msec as the guard durations have longer lengths in the case of a lower frame rate. In addition, as the DDI 400 employs at the lower frame rate, power may be saved. Further, in the case that the display panel 200 is driven in the above-described manner, the electronic device 100 according to the present disclosure may save power while providing an image having stable image quality without the flickering or shaking phenomenon of the image.

According to various embodiments described above, a DDI includes a receive interface that receives image data from a processor at a first frame rate, a memory that stores the image data received at the first frame rate, and a display timing controller that detects a variation of the image data stored in the memory, changes a frame rate for the image data, which is stored in the memory, based on the variation of the image data, and outputs the image data on the display at the changed frame rate.

According to various embodiments of the present disclosure, the display may be driven under lower power according to specified conditions (e.g., image display states) and image quality may be improved by varying frame rates according to the specified conditions (e.g., image display states).

Figure 11:
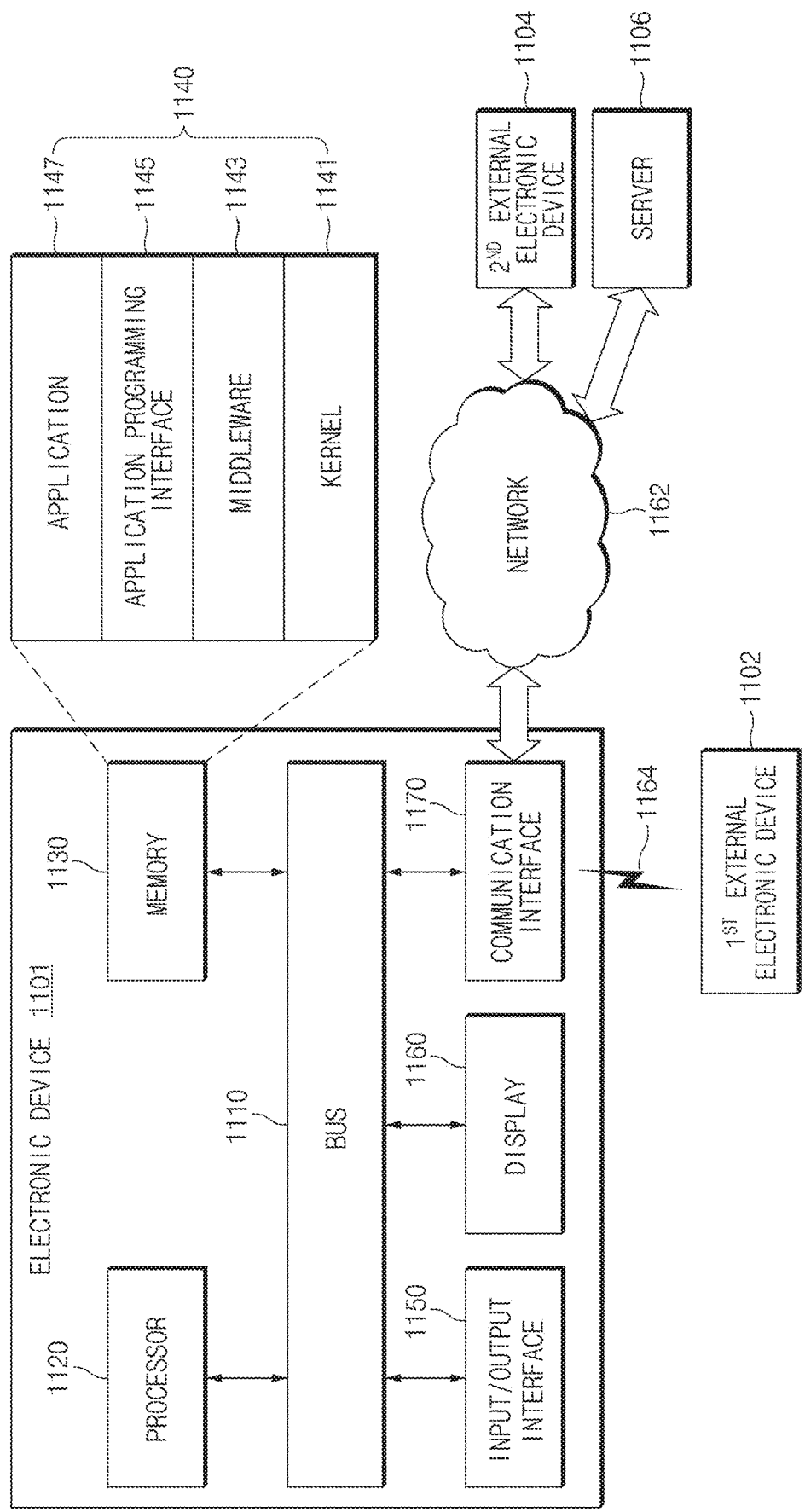
FIG. 11 illustrates an electronic device in a network environment according to various embodiments of the present disclosure.

FIG. 11 is a block diagram illustrating a configuration of an electronic device in a network environment according to various embodiments of the present disclosure.

Referring to FIG. 11, in various embodiments, an electronic device 1101 and a first external electronic device 1102, a second external electronic device 1104, or a server 1106 may connect with each other through a network 1162 or local-area communication 1164. The electronic device 1101 may include a bus 1110, a processor 1120, a memory 1130, an input and output interface 1150, a display 1160, and a communication interface 1170. In various embodiments, at least one of the components may be omitted from the electronic device 1101, or other components may be additionally included in the electronic device 1101.

The bus 1110 may be, for example, a circuit which connects the components 1120 to 1170 with each other and transmits a communication signal (e.g., a control message and/or data) between the components.

The processor 1120 may include one or more of a CPU, an AP, or a CP. For example, the processor 1120 may perform calculation or data processing about control and/or communication of at least another of the components of the electronic device 1101.

The memory 1130 may include a volatile and/or non-volatile memory. The memory 1130 may store, for example, a command or data associated with at least another of the components of the electronic device 1101. According to an embodiment, the memory 1130 may store S/W and/or a program 1140. The program 1140 may include, for example, a kernel 1141, a middleware 1143, an application programming interface (API) 1145, and/or at least one application program 1147 (or "at least one application"), and the like. At least part of the kernel 1141, the middleware 1143, or the API 1145 may be referred to as an operating system (OS).

The kernel 1141 may control or manage, for example, system resources (e.g., the bus 1110, the processor 1120, or the memory 1130, and the like) used to execute an operation or function implemented in the other programs (e.g., the middleware 1143, the API 1145, or the application program 1147). Also, as the middleware 1143, the API 1145, or the application program 1147 accesses a separate component of the electronic device 1101, the kernel 1141 may provide an interface which may control or manage system resources.

The middleware 1143 may play a role as, for example, a go-between such that the API 1145 or the application program 1147 communicates with the kernel 1141 to communicate data.

Also, the middleware 1143 may process one or more work requests, received from the application program 1147, in order of priority. For example, the middleware 1143 may assign priority which may use system resources (the bus 1110, the processor 1120, or the memory 1130, and the like) of the electronic device 1101 to at least one of the at least one application program 1147. For example, the middleware 1143 may perform scheduling or load balancing for the one or more work requests by processing the one or more work requests in order of the priority assigned to the at least one of the at least one application program 1147.

The API 1145 may be, for example, an interface in which the application program 1147 controls a function provided from the kernel 1141 or the middleware 1143. For example, the API 1145 may include at least one interface or function (e.g., a command) for file control, window control, image processing, or text control, and the like.

The input and output interface 1150 may play a role as, for example, an interface which may transmit a command or data input from a user or another external device to another component (or other components) of the electronic device 1101. Also, input and output interface 1150 may output an instruction or data received from another component (or other components) of the electronic device 1101 to the user or the other external device.

The display 1160 may include, for example, a LCD, a light emitting diode (LED) display, an OLED display, a microelectromechanical systems (MEMS) display, or an electronic paper display. The display 1160 may display, for example, a variety of content (e.g., text, images, videos, icons, or symbols, and the like) to the user. The display 1160 may include a touch screen, and may receive, for example, touch, gesture, proximity, or a hovering input using an electronic pen or part of a body of the user.

The communication interface 1170 may establish communication between, for example, the electronic device 1101 and an external device (e.g., a first external electronic device 1102, a second external electronic device 1104, or a server 1106). For example, the communication interface 1170 may connect to a network 1162 through wireless communication or wired communication and may communicate with the external device (e.g., the second external electronic device 1104 or the server 1106).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 1164. The local-area communication 1164 may include, for example, at least one of Wi-Fi communication, Bluetooth (BT) communication, near field communication (NFC), or global navigation satellite system (GNSS) communication, and the like.

A magnetic secure transmission (MST) module may generate a pulse based on transmission data using an electromagnetic signal and may generate a magnetic field signal based on the pulse. The electronic device 1101 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 1162 may include a telecommunications network, for example, at least one of a computer network (e.g., a local area network (LAN) or a wide area network (WAN)), the Internet, or a telephone network.

Each of the first and second external electronic devices 1102 and 1104 may be the same as or different device from the electronic device 1101. According to an embodiment, the server 1106 may include a group of one or more servers. According to various embodiments, all or some of operations executed in the electronic device 1101 may be executed in another electronic device or a plurality of electronic devices (e.g., the first external electronic device 1102, the second external electronic device 1104, or the server 1106). According to an embodiment, if the electronic device 1101 should perform any function or service automatically or according to a request, it may request another device (e.g., the first external electronic device 1102, the second external electronic device 1104, or the server 106) to perform at least part of the function or service, rather than executing the function or service for itself or in addition to the function or service. The other electronic device (e.g., the first external electronic device 1102, the second external electronic device 1104, or the server 1106) may execute the requested function or the added function and may transmit the executed result to the electronic device 1101. The electronic device 1101 may process the received result without change or additionally and may provide the requested function or service. For this purpose, for example, cloud computing technologies, distributed computing technologies, or client-server computing technologies may be used.

Figure 12:
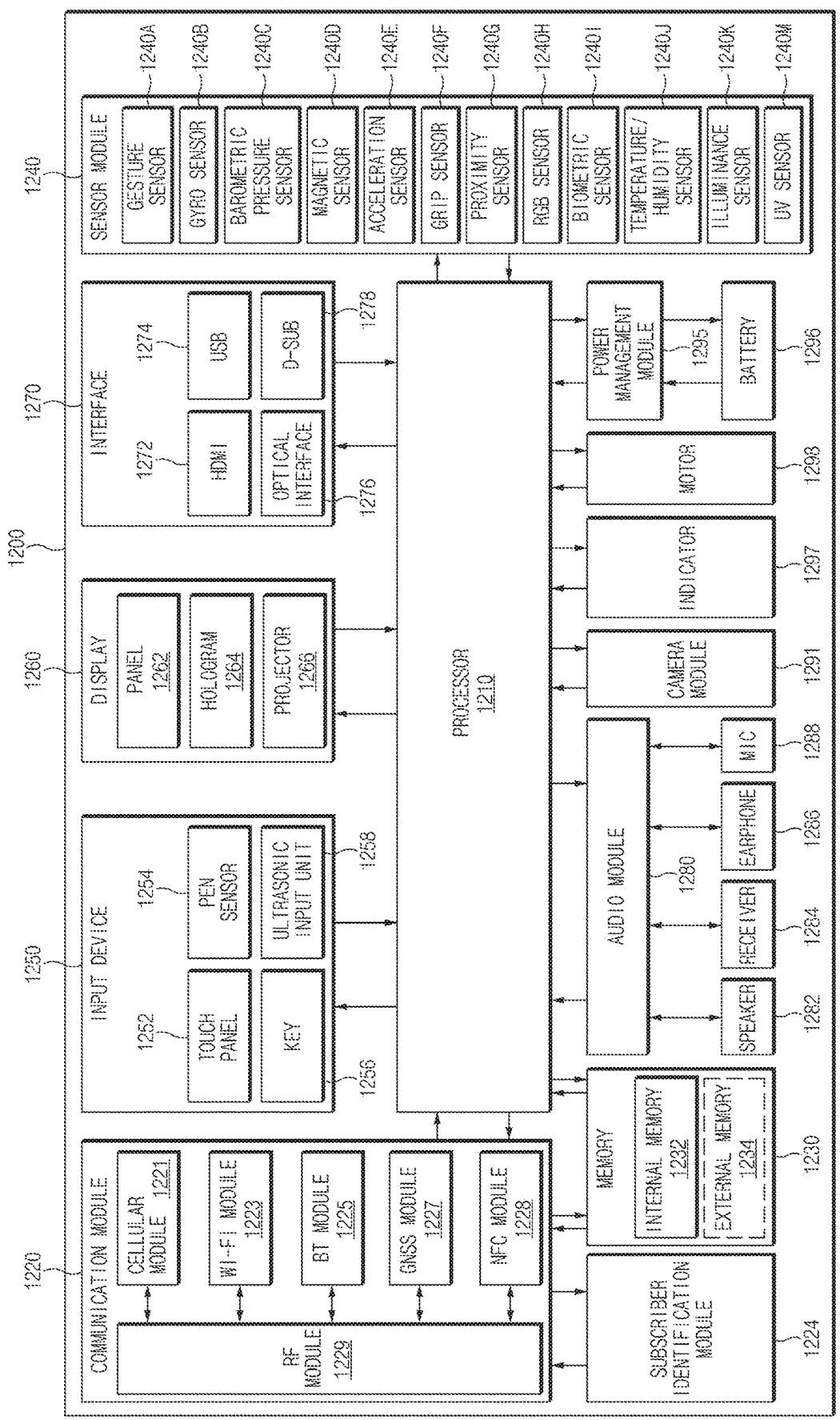
FIG. 12 illustrates a block diagram of an electronic device according to various embodiments of the present disclosure.

FIG. 12 is a block diagram illustrating a configuration of an electronic device according to various embodiments of the present disclosure.

Referring to FIG. 12, the electronic device 1201 may include, for example, all or part of an electronic device 1101 shown in FIG. 11. The electronic device 1201 may include one or more processors 1210 (e.g., APs), a communication module 1220, a subscriber identification module (SIM) 1229, a memory 1230, a security module 1236, a sensor module 1240, an input device 1250, a display 1260, an interface 1270, an audio module 1280, a camera module 1291, a power management module 1295, a battery 1296, an indicator 1297, and a motor 1298.

The processor 1210 may drive, for example, an OS or an application program to control a plurality of H/W or S/W components connected thereto and may process and compute a variety of data. The processor 1210 may be implemented with, for example, a system on chip (SoC). According to an embodiment, the processor 1210 may include a GPU (not shown) and/or an image signal processor (ISP) (not shown). The processor 1210 may include at least some (e.g., a cellular module 1221) of the components shown in FIG. 12. The processor 1210 may load a command or data received from at least one of other components (e.g., a non-volatile memory) into a volatile memory to process the data and may store various data in a non-volatile memory.

The communication module 1220 may have the same or similar configuration to a communication interface 1170 of FIG. 11. The communication module 1220 may include, for example, the cellular module 1221, a Wi-Fi module 1223, BT module 1225, a GNSS module 1227 (e.g., a GPS module, a Glonass module, a Beidou module, or a Galileo module), a NFC module 1228, an MST module, and a radio frequency (RF) module 1229.

The cellular module 1221 may provide, for example, a voice call service, a video call service, a text message service, or an Internet service, and the like through a communication network. According to an embodiment, the cellular module 1221 may identify and authenticate the electronic device 1201 in a communication network using the SIM 1224 (e.g., a SIM card). According to an embodiment, the cellular module 1221 may perform at least part of functions which may be provided by the processor 1210. According to an embodiment, the cellular module 1221 may include a CP.

The Wi-Fi module 1223, the BT module 1225, the GNSS module 1227, the NFC module 1228, or the MST module may include, for example, a processor for processing data transmitted and received through the corresponding module. According to various embodiments, at least some (e.g., two or more) of the cellular module 1221, the Wi-Fi module 1223, the BT module 1225, the GNSS module 1227, the NFC module 1228, or the MST module may be included in one integrated chip (IC) or one IC package.

The RF module 1229 may transmit and receive, for example, a communication signal (e.g., an RF signal). Though not shown, the RF module 1229 may include, for example, a transceiver, a power amplifier module (PAM), a frequency filter, or a low noise amplifier (LNA), or an antenna, and the like. According to another embodiment, at least one of the cellular module 1221, the Wi-Fi module 1223, the BT module 1225, the GNSS module 1227, the NFC module 1228, or the MST module may transmit and receive an RF signal through a separate RF module.

The SIM 1224 may include, for example, a card which includes a SIM and/or an embedded SIM. The SIM 1224 may include unique identification information (e.g., an integrated circuit card identifier (ICCID)) or subscriber information (e.g., an international mobile subscriber identity (IMSI)).

The memory 1230 (e.g., a memory 1130 of FIG. 11) may include, for example, an internal memory 1232 or an external memory 1234. The embedded memory 1232 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1234 may include a flash drive, for example, a compact flash (CF), a secure digital (SD), a micro-SD, a mini-SD, an extreme digital (xD), a multimedia card (MMC), or a memory stick, and the like. The external memory 1234 may operatively and/or physically connect with the electronic device 1201 through various interfaces.

The sensor module 1240 may measure, for example, a physical quantity or may detect an operation state of the electronic device 1201, and may convert the measured or detected information to an electric signal. The sensor module 1240 may include at least one of, for example, a gesture sensor 1240A, a gyro sensor 1240B, a barometer sensor 1240C, a magnetic sensor 1240D, an acceleration sensor 1240E, a grip sensor 1240F, a proximity sensor 1240G, a color sensor 1240H (e.g., red, green, blue (RGB) sensor), a biometric sensor 1240I, a temperature/humidity sensor 1240J, an illumination sensor 1240K, or an ultraviolet (UV) sensor 1240M. Additionally or alternatively, the sensor module 1240 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1240 may further include a control circuit for controlling at least one or more sensors included therein. According to various embodiments, the electronic device 1201 may further include a processor configured to control the sensor module 1240, as part of the processor 1210 or to be independent of the processor 1210. While the processor 1210 is in a sleep state, the electronic device 1201 may control the sensor module 1240.

The input device 1250 may include, for example, a touch panel 1252, a (digital) pen sensor 1254, a key 1256, or an ultrasonic input device 1258. The touch panel 1252 may use at least one of, for example, a capacitive type, a resistive type, an infrared type, or an ultrasonic type. Also, the touch panel 1252 may further include a control circuit. The touch panel 1252 may further include a tactile layer and may provide a tactile reaction to a user.

The (digital) pen sensor 1254 may be, for example, part of the touch panel 1252 or may include a separate sheet for recognition. The key 1256 may include, for example, a physical button, an optical key, or a keypad. The ultrasonic input device 1258 may allow the electronic device 1201 to detect a sound wave using a microphone (e.g., a microphone 1288) and to verify data through an input tool generating an ultrasonic signal.

The display 1260 (e.g., a display 1160 of FIG. 11) may include a panel 1262, a hologram device 1264, or a projector 1266. The panel 1262 may include the same or similar configuration to the display 160 or 1160. The panel 1262 may be implemented to be, for example, flexible, transparent, or wearable. The panel 1262 and the touch panel 1252 may be integrated into one module. The hologram device 1264 may show a stereoscopic image in a space using interference of light. The projector 1266 may project light onto a screen to display an image. The screen may be positioned, for example, inside or outside the electronic device 1201. According to an embodiment, the display 1260 may further include a control circuit for controlling the panel 1262, the hologram device 1264, or the projector 1266.

The interface 1270 may include, for example, a HDMI 1272, a USB 1274, an optical interface 1276, or a D-subminiature 1278. The interface 1270 may be included in, for example, a communication interface 1170 shown in FIG. 11. Additionally or alternatively, the interface 1270 may include, for example, a mobile high definition link (MHL) interface, an SD card/MMC interface, or an infrared data association (IrDA) standard interface.

The audio module 1280 may convert a sound and an electric signal in dual directions. At least part of components of the audio module 1280 may be included in, for example, an input and output interface 1150 (or a user interface (UI)) shown in FIG. 11. The audio module 1280 may process sound information input or output through, for example, a speaker 1282, a receiver 1284, an earphone 1286, or the microphone 1288, and the like.

The camera module 1291 may be a device which captures a still image and a moving image. According to an embodiment, the camera module 1291 may include one or more image sensors (not shown) (e.g., a front sensor or a rear sensor), a lens (not shown), an ISP (not shown), or a flash (not shown) (e.g., an LED or a xenon lamp).

The power management module 1295 may manage, for example, power of the electronic device 1201. According to an embodiment, though not shown, the power management module 1295 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1296 and voltage, current, or temperature thereof while the battery 1296 is charged. The battery 1296 may include, for example, a rechargeable battery or a solar battery.

The indicator 1297 may display a specific state of the electronic device 1201 or part (e.g., the processor 1210) thereof, for example, a booting state, a message state, or a charging state, and the like. The motor 1298 may convert an electric signal into mechanical vibration and may generate vibration or a haptic effect, and the like. Though not shown, the electronic device 1201 may include a processor (e.g., a GPU) for supporting a mobile TV. The processor for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 13:
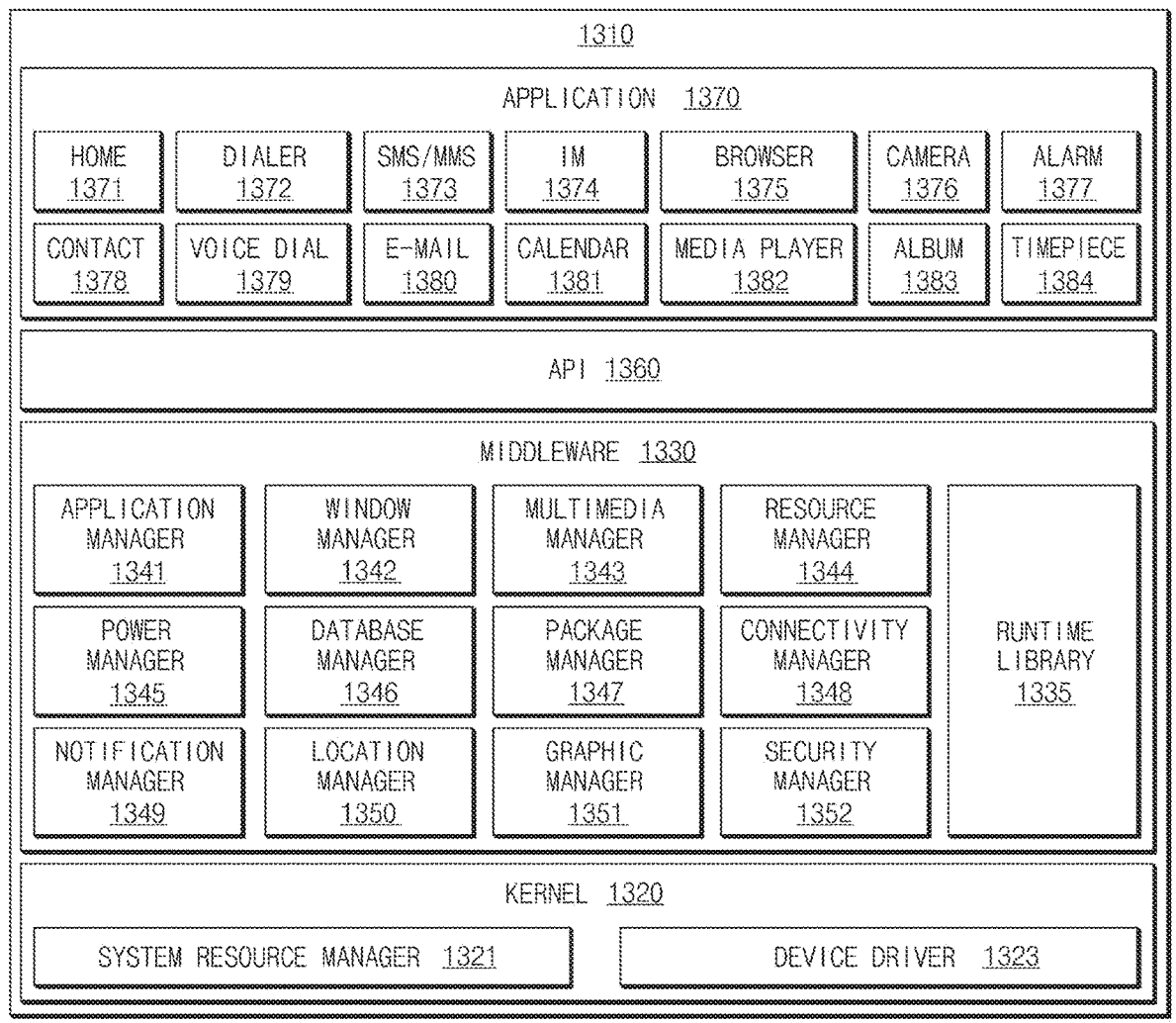
FIG. 13 illustrates a block diagram of an electronic device according to various embodiments of the present disclosure.

FIG. 13 is a block diagram illustrating a configuration of a program module according to various embodiments of the present disclosure.

According to an embodiment, the program module 1310 (e.g., a program 1140 of FIG. 11) may include an OS for controlling resources associated with an electronic device (e.g., an electronic device 1101 of FIG. 11) and/or various applications (e.g., an application program 1147 of FIG. 11) which are executed on the OS. The OS may be, for example, Android, iOS, Windows, Symbian, Tizen, or Bada, and the like.

The program module 1310 may include a kernel 1320, a middleware 1330, an API 1360, and/or an application 1370. At least part of the program module 1310 may be preloaded on the electronic device, or may be downloaded from an external electronic device (e.g., a first external electronic device 1102, a second external electronic device 1104, or a server 1106, and the like of FIG. 11).

The kernel 1320 (e.g., a kernel 1141 of FIG. 11) may include, for example, a system resource manager 1321 and/or a device driver 1323. The system resource manager 1321 may control, assign, or collect, and the like system resources. According to an embodiment, the system resource manager 1321 may include a process management unit, a memory management unit, or a file system management unit, and the like. The device driver 1323 may include, for example, a display driver, a camera driver, a BT driver, a shared memory driver, a USB driver, a keypad driver, a Wi-Fi driver, an audio driver, or an inter-process communication (IPC) driver.

The middleware 1330 (e.g., a middleware 1143 of FIG. 11) may provide, for example, functions the application 1370 needs in common, and may provide various functions to the application 1370 through the API 1360 such that the application 1370 efficiently uses limited system resources in the electronic device. According to an embodiment, the middleware 1330 (e.g., the middleware 1143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, a security manager 1352, or a payment manager.

The runtime library 1335 may include, for example, a library module used by a compiler to add a new function through a programming language while the application 1370 is executed. The runtime library 1335 may perform a function about input and output management, memory management, or an arithmetic function.

The application manager 1341 may manage, for example, a life cycle of at least one of the application 1370. The window manager 1342 may manage graphic user interface (GUI) resources used on a screen of the electronic device. The multimedia manager 1343 may determine a format utilized for reproducing various media files and may encode or decode a media file using a codec corresponding to the corresponding format. The resource manager 1344 may manage source codes of at least one of the application 1370, and may manage resources of a memory or a storage space, and the like.

The power manager 1345 may act together with, for example, a basic input/output system (BIOS) and the like, may manage a battery or a power source, and may provide power information utilized for an operation of the electronic device. The database manager 1346 may generate, search, or change a database to be used in at least one of the application 1370. The package manager 1347 may manage installation or update of an application distributed by a type of a package file.

The connectivity manager 1348 may manage, for example, wireless connection such as Wi-Fi connection or BT connection, and the like. The notification manager 1349 may display or notify events, such as an arrival message, an appointment, and proximity notification, by a method which is not disturbed to the user. The location manager 1350 may manage location information of the electronic device. The graphic manager 1351 may manage a graphic effect to be provided to the user or a UI related to the graphic effect. The security manager 1352 may provide all security functions utilized for system security or user authentication, and the like. According to an embodiment, when the electronic device (e.g., an electronic device 100 or 1101 of FIG. 1 or 11) has a phone function, the middleware 1330 may further include a telephony manager (not shown) for managing a voice or video communication function of the electronic device.

The middleware 1330 may include a middleware module which configures combinations of various functions of the above-described components. The middleware 1330 may provide a module which specializes according to kinds of OSs to provide a differentiated function. Also, the middleware 1330 may dynamically delete some of old components or may add new components.

The API 1360 (e.g., an API 1145 of FIG. 11) may be, for example, a set of API programming functions, and may be provided with different components according to OSs. For example, in case of Android or iOS, one API set may be provided according to platforms. In case of Tizen, two or more API sets may be provided according to platforms.

The application 1370 (e.g., an application program 1147 of FIG. 11) may include one or more of, for example, a home application 1371, a dialer application 1372, a short message service/multimedia messaging service (SMS/MMS) application 1373, an instant message (IM) application 1374, a browser application 1375, a camera application 1376, an alarm application 1377, a contact application 1378, a voice dial application 1379, an e-mail application 1380, a calendar application 1381, a media player application 1382, an album application 1383, a clock application 1384, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 1370 may include an application (hereinafter, for better understanding and ease of description, referred to as "information exchange application") for exchanging information between the electronic device (e.g., the electronic device 1101 of FIG. 11) and an external electronic device (e.g., the first external electronic device 1102 or the second external electronic device 1104). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 1102 or the second external electronic device 1104). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 1102 or the second external electronic device 1104) which communicates with the electronic device, an application which operates in the external electronic device, or a service (e.g., a call service or a message service) provided from the external electronic device.

According to an embodiment, the application 1370 may include an application (e.g., the health card application of a mobile medical device) which is preset according to attributes of the external electronic device (e.g., the first external electronic device 1102 or the second external electronic device 1104). According to an embodiment, the application 1370 may include an application received from the external electronic device (e.g., the server 1106, the first external electronic device 1102, or the second external electronic device 1104). According to an embodiment, the application 1370 may include a preloaded application or a third party application which may be downloaded from a server. Names of the components of the program module 1310 according to various embodiments of the present disclosure may differ according to kinds of OSs.

According to various embodiments, at least part of the program module 1310 may be implemented with software, firmware, hardware, or at least two or more combinations thereof. At least part of the program module 1310 may be implemented (e.g., executed) by, for example, a processor (e.g., a processor 1120 of FIG. 11). At least part of the program module 1310 may include, for example, a module, a program, a routine, sets of instructions, or a process, and the like for performing one or more functions.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a H/W device (e.g., a read only memory (ROM), a random access memory (RAM), or a flash memory, and the like), and the like. Also, the program instructions may include not only mechanical codes compiled by a compiler but also high-level language codes which may be executed by a computer using an interpreter and the like. The above-mentioned H/W device may be configured to operate as one or more S/W modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of S/W or computer code that can be stored in a recording medium such as a CD ROM, a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such S/W that is stored on the recording medium using a general purpose computer, or a special processor or in programmable or dedicated hardware, such as an ASIC or FPGA. As would be understood in the art, the computer, the processor, microprocessor controller or the programmable H/W include memory components, e.g., RAM, ROM, Flash, etc. that may store or receive S/W or computer code that when accessed and executed by the computer, processor or H/W implement the processing methods described herein.

The control unit may include a microprocessor or any suitable type of processing circuitry, such as one or more general-purpose processors (e.g., advanced reduced instruction set computer (RISC) machines (ARM)-based processors), a digital signal processor (DSP), a programmable logic device (PLD), an ASIC, a FPGA, a GPU, a video card controller, etc. In addition, it would be recognized that when a general purpose computer accesses code for implementing the processing shown herein, the execution of the code transforms the general purpose computer into a special purpose computer for executing the processing shown herein. Any of the functions and operations provided in the Figures may be implemented in hardware, S/W or a combination of both and may be performed in whole or in part within the programmed instructions of a computer. In addition, an artisan understands and appreciates that a "processor" or "microprocessor" may be HAY in the claimed disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display;
   at least one processor configured to process image data to be output on the display; and
   a display driver integrated circuit (DDI) configured to drive the display to output a display data corresponding to the image data, which is transmitted by the at least one processor, on the display,
   wherein the at least one processor is further configured to:
      change a frame rate of the display to a target frame rate, and
   wherein the change of the frame rate comprises:
      determine whether information for indicating an image data update and the image data, are received, and
      change the frame rate based on whether the information and the image data are received,
   wherein the DDI is further configured to:
      output the display data at a first frame rate based on the information and the image data being consecutively received, and
      output the display data at a second frame rate lower than the first frame rate based on the information not being received.

2. The electronic device of claim 1, wherein the change of the frame rate comprises changing the frame rate as a manner of stepwise changing from the frame rate to the target frame rate.

3. The electronic device of claim 1, wherein the at least one processor is further configured to determine the frame rate to have different values depending on a number of times the information is received or a length of a time the information is consecutively received.

4. The electronic device of claim 1, wherein the DDI is further configured to:
   output the display data at a third frame rate based on the information being maintained in a non-reception state, and
   output the display data at a fourth frame rate higher than the third frame rate based on the information being received after the information is in the non-reception state.

5. The electronic device of claim 1, wherein the DDI is further configured to, based on a target frame rate value becoming smaller than a previous frame rate value, or based on a transmission rate of one frame becoming greater than a previous transmission rate, maintain a duration that a gate signal or a source signal is supplied based on the changed frame rate while expanding a width of a guard duration that the gate signal or the source signal is not supplied.

6. The electronic device of claim 1, wherein the at least one processor is further configured to:
   when a type of an executing application being is a first type, generate control information for changing the frame rate of the display into a fifth frame rate, and
   when a type of the executing application being is a second type different with the first type, generate control information for changing the frame rate of the display into a sixth frame rate higher than the fifth frame rate, and
   wherein the DDI is further configured to change the frame rate of the display to the fifth frame rate or the sixth frame rate based on control information received from the at least one processor.

7. The electronic device of claim 6, wherein the at least one processor is further configured to:
   generate control information for requesting to process the image data at a seventh frame rate for a duration that an image change is absent, based on the application being an application in which the image change is absent for at least a specified time,
   generate control information for requesting to process the image data at an eighth frame rate higher than the seventh frame rate, based on the application being an application in which the image change appears below a threshold, or
   generate control information for requesting to process the image data at a ninth frame rate higher than the eighth frame rate, based on the application being an application in which the image change appears above a threshold.

8. The electronic device of claim 1, wherein the at least one processor is further configured to:
   determine whether to update image data stored in a frame buffer, and
   transmit control information related to the change of the frame rate to the DDI based on the image data being updated.

9. The electronic device of claim 1, wherein the determining whether information comprises, by the at least one processor, determining change of at least one of a front porch or a back porch, at least one of the front porch or the back porch corresponds to a guard duration that a gate signal or a source signal is not supplied at both sides of a signal duration corresponding to the frame.

* * * * *